United States Patent
Subbarayan et al.

(10) Patent No.: US 10,666,621 B2
(45) Date of Patent: May 26, 2020

(54) METHODS AND SYSTEMS FOR API PROXY BASED ADAPTIVE SECURITY

(71) Applicant: Ping Identity Corporation, Denver, CO (US)

(72) Inventors: Udayakumar Subbarayan, Bangalore (IN); Bernard Harguindeguy, Atherton, CA (US); Anoop Krishnan Gopalakrishnan, Bangalore (IN); Abdu Raheem Poonthiruthi, Bangalore (IN)

(73) Assignee: Ping Identity Corporation, Denver, CO (US)

( * ) Notice: Subject to any disclaimer, the term of this patent is extended or adjusted under 35 U.S.C. 154(b) by 0 days.

(21) Appl. No.: 16/050,915

(22) Filed: Jul. 31, 2018

(65) Prior Publication Data
US 2018/0337891 A1 Nov. 22, 2018

Related U.S. Application Data

(63) Continuation of application No. 15/164,587, filed on May 25, 2016, now Pat. No. 10,193,867.
(Continued)

(51) Int. Cl.
*H04L 29/06* (2006.01)
*H04L 12/24* (2006.01)
(Continued)

(52) U.S. Cl.
CPC .......... *H04L 63/0281* (2013.01); *G06F 9/546* (2013.01); *H04L 41/0813* (2013.01);
(Continued)

(58) Field of Classification Search
CPC combination set(s) only.
See application file for complete search history.

(56) References Cited

U.S. PATENT DOCUMENTS

| 6,336,117 B1 | 1/2002 | Massarani |
| 7,209,962 B2 * | 4/2007 | Boden ................. H04L 63/0227 709/223 |

(Continued)

FOREIGN PATENT DOCUMENTS

WO  WO 2016/168368  10/2016

OTHER PUBLICATIONS

Office Action for U.S. Appl. No. 15/164,512, dated Jul. 6, 2018, 9 pages.
(Continued)

*Primary Examiner* — Malcolm Cribbs

(57) ABSTRACT

The invention concerns API proxy based adaptive security. The invention implements adaptive security for API servers, while avoiding data bottlenecks and maintaining client experience. The invention provides methods and configurations for API security that may be employed at proxies for implementing routing decisions involving client messages received at said proxies. The invention also involves generating or collecting at proxies, log information that captures data corresponding to received client messages and responses from API servers—which log information correlates communications between clients, proxies and backend API servers, and includes data relevant for purposes generating API metrics and identifying anomalies and/or indicators of compromise. The invention yet further provides security server clusters configured for generating API metrics and/or identify anomalies or indicators of compromise—which may be used by proxies to terminate existing connections and block subsequent requests or messages from clients associated with the identified anomalies or indicators of compromise.

20 Claims, 12 Drawing Sheets

Related U.S. Application Data

(60) Provisional application No. 62/167,165, filed on May 27, 2015.

(51) Int. Cl.

| | | |
|---|---|---|
| *H04L 29/08* | (2006.01) | |
| *H04L 12/715* | (2013.01) | |
| *H04L 12/771* | (2013.01) | |
| *H04L 12/775* | (2013.01) | |
| *H04L 29/14* | (2006.01) | |
| *H04L 12/741* | (2013.01) | |
| *H04L 12/803* | (2013.01) | |
| *H04L 12/813* | (2013.01) | |
| *G06F 9/54* | (2006.01) | |

(52) U.S. Cl.
CPC .......... *H04L 41/0893* (2013.01); *H04L 41/12* (2013.01); *H04L 41/28* (2013.01); *H04L 41/50* (2013.01); *H04L 45/46* (2013.01); *H04L 45/56* (2013.01); *H04L 45/58* (2013.01); *H04L 45/74* (2013.01); *H04L 47/125* (2013.01); *H04L 47/20* (2013.01); *H04L 63/08* (2013.01); *H04L 63/166* (2013.01); *H04L 67/02* (2013.01); *H04L 67/10* (2013.01); *H04L 67/1068* (2013.01); *H04L 67/1095* (2013.01); *H04L 67/12* (2013.01); *H04L 67/145* (2013.01); *H04L 67/28* (2013.01); *H04L 67/32* (2013.01); *H04L 67/42* (2013.01); *H04L 69/16* (2013.01); *H04L 69/329* (2013.01); *H04L 69/40* (2013.01)

(56) References Cited

U.S. PATENT DOCUMENTS

| | | | |
|---|---|---|---|
| 7,743,089 B2 * | 6/2010 | Putzolu ................. | G06F 9/4868 709/202 |
| 8,339,959 B1 | 12/2012 | Moisand et al. | |
| 8,892,665 B1 * | 11/2014 | Rostami-Hesarsorkh ................... | H04L 29/06557 709/206 |
| 8,949,828 B2 | 2/2015 | Pafumi et al. | |
| 8,973,088 B1 * | 3/2015 | Leung ..................... | H04L 63/00 726/1 |
| 8,990,942 B2 | 3/2015 | Thakadu et al. | |
| 9,307,017 B2 | 4/2016 | Wang et al. | |
| 9,413,560 B2 | 8/2016 | Patil et al. | |
| 9,516,053 B1 | 12/2016 | Muddu et al. | |
| 9,537,756 B2 | 1/2017 | Bahadur et al. | |
| 9,948,703 B2 | 4/2018 | Olivier et al. | |
| 10,025,873 B2 | 7/2018 | Jackson et al. | |
| 10,193,867 B2 | 1/2019 | Subbarayan et al. | |
| 10,484,337 B2 | 11/2019 | Subbarayan et al. | |
| 10,587,580 B2 | 3/2020 | Subbarayan et al. | |
| 2001/0039586 A1 | 11/2001 | Primak et al. | |
| 2002/0112189 A1 | 8/2002 | Syvanne et al. | |
| 2003/0110172 A1 | 6/2003 | Selman et al. | |
| 2005/0165902 A1 | 7/2005 | Hellenthal et al. | |
| 2006/0159082 A1 | 7/2006 | Cook et al. | |
| 2007/0165622 A1 | 7/2007 | O'Rourke et al. | |
| 2007/0192506 A1 | 8/2007 | Gupta et al. | |
| 2008/0016339 A1 | 1/2008 | Shukla | |
| 2008/0263654 A1 | 10/2008 | Bahl et al. | |
| 2008/0320582 A1 * | 12/2008 | Chen ................. | H04L 63/0245 726/12 |
| 2009/0040926 A1 | 2/2009 | Li et al. | |
| 2009/0067440 A1 * | 3/2009 | Chadda ............... | H04L 63/0227 370/401 |
| 2009/0327459 A1 | 12/2009 | Yoo et al. | |
| 2010/0333111 A1 | 12/2010 | Kothamasu et al. | |
| 2011/0145842 A1 | 6/2011 | Tofighbakhsh et al. | |
| 2012/0054131 A1 | 3/2012 | Williamson | |
| 2012/0110603 A1 | 5/2012 | Kaneko et al. | |
| 2012/0226820 A1 | 9/2012 | Li et al. | |
| 2012/0233668 A1 | 9/2012 | Leafe et al. | |
| 2012/0290511 A1 | 11/2012 | Frank et al. | |
| 2012/0304244 A1 | 11/2012 | Xie et al. | |
| 2013/0044764 A1 | 2/2013 | Casado et al. | |
| 2013/0205028 A1 | 8/2013 | Crockett et al. | |
| 2014/0059226 A1 | 2/2014 | Messerli et al. | |
| 2014/0237594 A1 | 8/2014 | Thakadu et al. | |
| 2014/0258771 A1 | 9/2014 | Xie et al. | |
| 2014/0337268 A1 | 11/2014 | Bhattacharya et al. | |
| 2014/0362681 A1 | 12/2014 | Bahadur et al. | |
| 2015/0026794 A1 * | 1/2015 | Zuk ..................... | H04L 63/0227 726/13 |
| 2015/0095887 A1 | 4/2015 | Bhattacharya | |
| 2015/0161390 A1 | 6/2015 | Xuan | |
| 2015/0188760 A1 | 7/2015 | Anumala et al. | |
| 2015/0188808 A1 | 7/2015 | Ghanwani et al. | |
| 2015/0229579 A1 | 8/2015 | Kosim-Satyaputra et al. | |
| 2015/0234639 A1 | 8/2015 | Allsbrook | |
| 2015/0319226 A1 | 11/2015 | Mahmood | |
| 2016/0011732 A1 | 1/2016 | Yang | |
| 2016/0065672 A1 | 3/2016 | Savage et al. | |
| 2016/0092297 A1 * | 3/2016 | Mazon ..................... | H04L 67/28 714/15 |
| 2016/0234168 A1 | 8/2016 | Leung et al. | |
| 2016/0308721 A1 | 10/2016 | Dellisanti et al. | |
| 2016/0308900 A1 | 10/2016 | Sadika et al. | |
| 2016/0352588 A1 | 12/2016 | Subbarayan et al. | |
| 2016/0352867 A1 | 12/2016 | Subbarayan et al. | |
| 2016/0366155 A1 | 12/2016 | El-Moussa et al. | |
| 2017/0012941 A1 | 1/2017 | Subbarayan et al. | |
| 2018/0115523 A1 | 4/2018 | Subbarayan et al. | |
| 2018/0115578 A1 | 4/2018 | Subbarayan et al. | |
| 2018/0278635 A1 | 9/2018 | Shin | |
| 2018/0337892 A1 | 11/2018 | Subbarayan et al. | |
| 2018/0337893 A1 | 11/2018 | Subbarayan et al. | |
| 2018/0337894 A1 | 11/2018 | Subbarayan et al. | |
| 2019/0114417 A1 | 4/2019 | Subbarayan et al. | |

OTHER PUBLICATIONS

Office Action for U.S. Appl. No. 15/164,555, dated Jan. 9, 2019, 19 pages.

Office Action for U.S. Appl. No. 15/164,587, dated Feb. 22, 2018, 17 pages.

Office Action for U.S. Appl. No. 16/050,958, dated Dec. 31, 2018, 7 pages.

Office Action for U.S. Appl. No. 16/050,996, dated Nov. 16, 2018, 6 pages.

Office Action for U.S. Appl. No. 16/051,026, dated Dec. 13, 2018, 6 pages.

Office Action for U.S. Appl. No. 15/164,512, dated Feb. 28, 2019, 18 pages.

Office Action for U.S. Appl. No. 15/164,512, dated Aug. 15, 2019, 16 pages.

Office Action for U.S. Appl. No. 15/792,850, dated Aug. 8, 2019, 9 pages.

Office Action for U.S. Appl. No. 15/793,671, dated Jul. 8, 2019, 36 pages.

Extended European Search Report for European Application No. 18200235.2, dated Feb. 11, 2019, 9 pages.

Office Action for U.S. Appl. No. 15/164,555, dated Oct. 24, 2019, 24 pages.

Ghaffarian, S. M. et al., "Software vulnerability analysis and discovery using machine-learning and data-mining techniques: A Survey," ACM Computing Surveys, vol. 50, No. 4, Article 56, pp. 1-36 (Aug. 2017).

Office Action for U.S. Appl. No. 16/158,836, dated Nov. 18, 2019, 13 pages.

Hachinyan, O., Detection of Malicious Software Based on Multiple Equations of API-call Sequences, Feb. 2017, IEEE, pp. 415-418.

(56) References Cited

OTHER PUBLICATIONS

Office Action for European Application No. 18200235.2, dated Jan. 30, 2020, 7 pages.

* cited by examiner

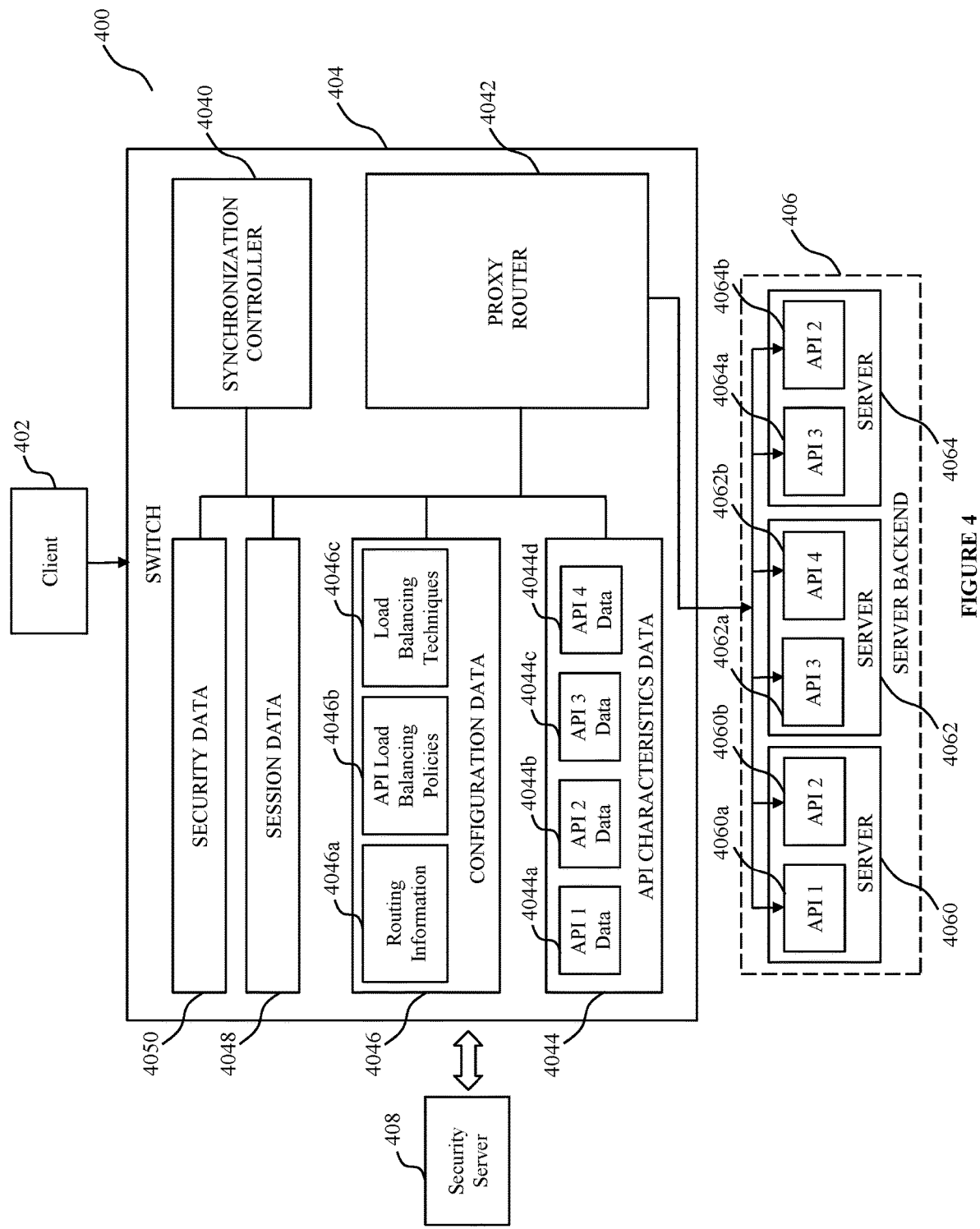

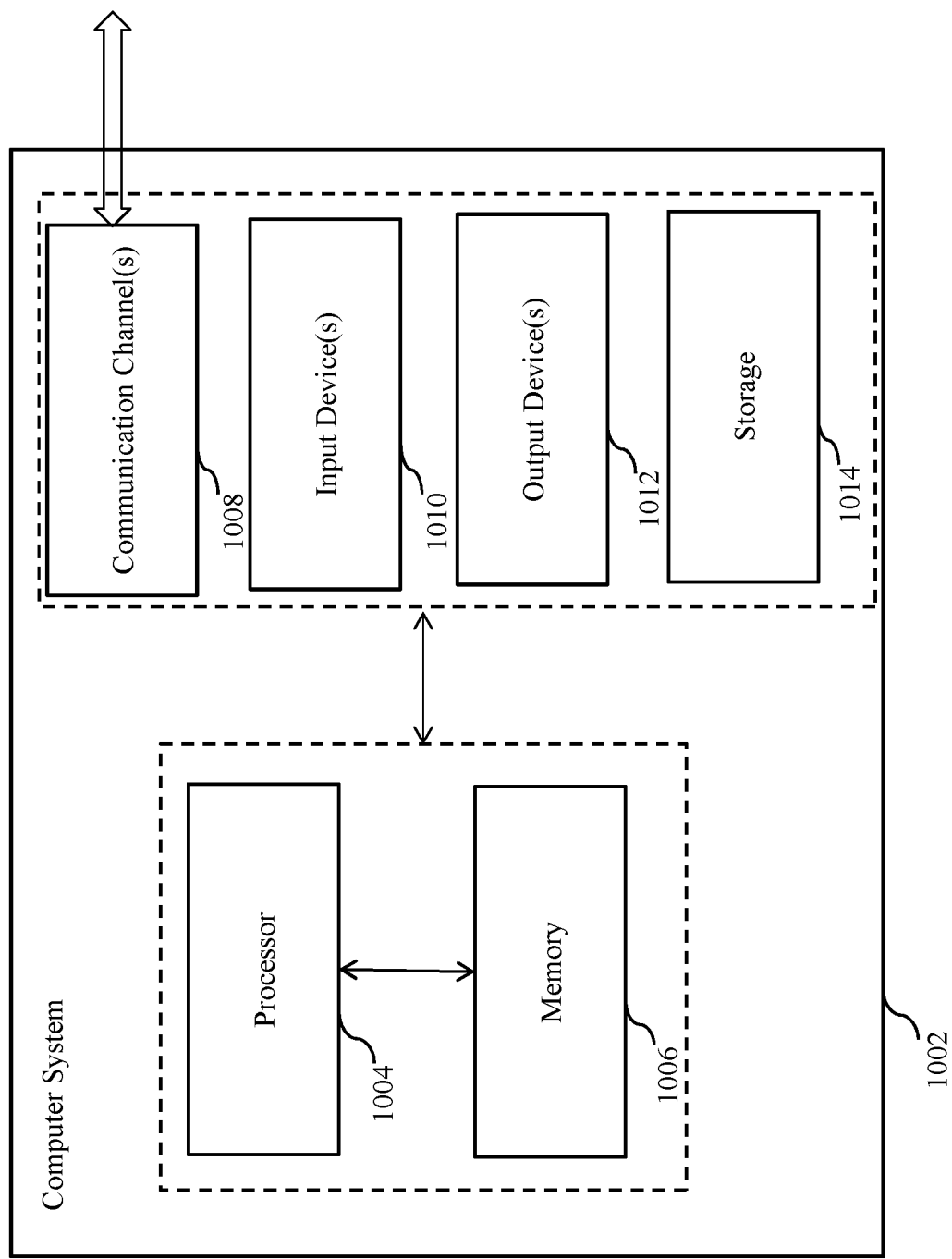

METHODS AND SYSTEMS FOR API PROXY BASED ADAPTIVE SECURITY

CROSS-REFERENCES TO RELATED APPLICATIONS

This application is a continuation of U.S. patent application Ser. No. 15/164,587, filed May 25, 2016, now pending, which claims the benefit of U.S. Provisional Patent Application No. 62/167,165, filed May 27, 2015, the entire contents of which are hereby incorporated by reference.

FIELD OF INVENTION

The present invention relates to the domain of API traffic monitoring and API security. In particular, the invention enables API traffic monitoring and API server security through API proxy based traffic monitoring and security enforcement. In specific embodiments, the invention implements API traffic monitoring for data analytics and API security purposes.

BACKGROUND OF THE INVENTION

API based web applications, distributed applications and client server applications may use one or more proxy nodes (including servers, virtual machines and linux containers) interposed between clients and servers for routing, load balancing and security at the API layer. Proxy nodes of the above type distribute incoming client requests or messages among multiple servers to ensure one or more of targeted routing, balanced server utilization, minimized server overloads, and high availability.

Proxies of router or load balancer type receive client requests or messages, select an appropriate server(s) for processing the requests or messages and transmit the requests or messages to the selected server(s).

FIG. 1 illustrates a network architecture 100 comprising a proxy 104 disposed as a network intermediate between clients 102 (i.e. clients 102a, 102b and 102c) and servers 106 (106a, 106b and 106c).

Based on information retrieved from a DNS server or other name server, requests or messages from client 102 for services from server backend 106 are directed to proxy 104. Proxy 104 transmits the received requests or messages to an appropriate server (106a to 106c) within server backend 106. Depending on the configuration of proxy 104, responses from servers 106a to 106c may first be received at proxy 104 and thereafter redirected to requesting client 102.

In implementing proxy functionality (for example, routing or load balancing), a proxy receives data packets addressed to a target service or server. The proxy transmits the data packets to an appropriate server based on predefined policies and techniques (e.g. routing or load balancing policies and techniques). In prior art proxies, such switching decisions typically rely on information associated with Layers 2 to 4 of the Open System Interconnection ("OSI") model, or Transmission Control Protocol/Internet Protocol ("TCP/IP").

FIG. 2 illustrates protocol layers of the OSI model 200 and the corresponding TCP/IP model. In the OSI model, each network device modularly implements the various OSI layers. Beginning with Layer 7 and progressing downward, each layer communicates with the layer immediately below and immediately above. As devices move to lower layers, the information is increasingly packaged for the specific hardware associated with the device/network—concluding in Layer 1, which is the physical communication channel. Under TCP/IP, Layers 1 to 2 are implemented as a subnet (or MAC) stack, Layer 3 as the Internet (or IP) stack, Layer 4 as the transport (or TCP/UDP) stack, and Layers 5 to 7 as the Application stack. Data generated by a first network device is processed down the protocol stacks, from Layer 7 to Layer 1, into a packet, with each stack adding a header to the packet. The packet is then transmitted over a physical channel to a second network device, which processes the packet up the stacks starting from Layer 1, and unwraps the respective headers after terminating them at their associated stacks. At Layer 7, the application data of the first device is retrieved for interaction with the application of the second device.

FIG. 3 illustrates various headers of an IP packet 300. Each IP packet consists of a data portion for carrying a data payload and a header portion for carrying overhead information. The header portion is partitioned into layer or protocol dependent headers. By way of example, a Layer 2 or MAC header includes a destination MAC address and a source MAC address that specify the destination and source hardware addresses of a node within a subnet. A Layer 3 or IP header includes a source IP address and a destination IP address that respectively specify the IP addresses of the source and destination nodes on the Internet. A Layer 4 or TCP header includes a source TCP port and a destination TCP port that respectively specify the port numbers used by the source node and the destination node.

The payload/data portion of the IP packet contains Layer 7 information which includes data generated by the application. This data may include HTTP headers—which is regarded as application data and is therefore located in the payload portion of the IP packet. The HTTP header may comprise a URL field for specifying a URL that the data packet is requesting, and may also include a cookie field for the application to communicate environmental information.

Implementing data analytics or security solutions at an individual server level has certain associated limitations, inasmuch that the pool of analyzed data is limited to data received at the individual server—which limits the reliability and accuracy of the results of such analysis.

Additionally, implementing first level security analysis at the server level is a less than optimal solution, for the reason that a server necessarily requires to receive a client request or message before it can determine whether such request or message comprises a security threat. The fact that a security threat necessarily has to be received at a server (thereby subjecting the server to the likelihood of damage) before the security threat can be identified or assessed, presents challenges of its own to server security.

Existing API security solutions also face challenges in terms of big data characteristics of velocity (increasing bandwidth and increasing processing powers of devices resulting in increasing demand for web services and APIs), volume (increasing number of API requests from increasing number of users having increasing number of devices), variety (increasing number of available web services and APIs) and veracity (identifying source and security or authentication related parameters of web service access data and/or API access data).

There is accordingly a need for efficient data analytics and security solutions that protect a server backend from security threats. Additionally, the security solutions need to be tailored for addressing the specific security requirements associated with big data capture, streaming and processing for protecting APIs at the edge of (i.e. at entry points of) cloud and data centers using aggregated information from various endpoints.

SUMMARY

The invention enables API traffic monitoring and API server security through API proxy based traffic monitoring and security enforcement.

In an embodiment, the invention provides a proxy configured for routing client messages to one or more target APIs. The proxy comprises (i) a processor, (ii) a proxy router configured to (a) extract from data packets corresponding to a received client message, an API name and hostname corresponding to a target API, (b) compare the extracted API name against API names associated with each of a set of API characteristics data definitions, and (c) responsive to failure to identify an API characteristics data definition comprising an API name that matches the extracted API name, discard the received client message, without onward transmission to an API server identified in the received client message.

The proxy router may be further configured such that, in response to successful identification of an API characteristics data definition comprising an API name that matches the extracted API name, the proxy router (i) compares at least one of a communication protocol, protocol method and content type specified within the received client message against one or more permitted communication protocols, permitted protocol methods or permitted content types associated with the identified API characteristics data definition, and (ii) responsive to determining that at least one of the communication protocol, protocol method or content type specified within the received client message does not match permitted communication protocols, permitted protocol methods or permitted content types associated with the identified API characteristics data definition, discards the received client message without onward transmission to an API server identified in the received client message.

The proxy router may be configured such that responsive to discarding a received client message without onward transmission to an API server identified in the received client message, the proxy router returns an error message to a client associated with the discarded client message.

The invention additionally provides a system for securing one or more API servers. The system comprises (i) a proxy cluster configured for routing client messages to at least one target API implemented on the one or more API servers, the proxy cluster comprising a networked plurality of proxies, wherein each of the plurality of proxies are configured to (a) extract information identifying a target API from data packets corresponding to a received client message, and transmit the received client message to an API server implementing the target API, and (b) responsive to receiving an indicator of compromise, discarding a received client message corresponding to a client or connection id associated with the received indicator of compromise, without onward transmission to an API server identified in the received client message, and (iii) a set of security servers comprising at least one security server, wherein the set of security servers are configured to identify one or more indicators of compromise, based on the data received from the proxies within the proxy cluster.

The set of security servers may be further configured for one or more of generating API metrics, generating blocked connection metrics, generating back end error code metrics, and identifying anomalies.

In an embodiment, the data received from the proxies at the set of security servers for identification of one or more indicators of compromise, includes (i) proxy access log information, and (ii) one or more of API characteristics data definitions, configuration data, session data and security data associated with the proxies.

In a system embodiment, proxy access log information may comprise one or more of (i) time stamp information corresponding to one or more communications received at or sent from a proxy, (ii) connection id of a client communicating with a proxy, (iii) connection id of a client communicating with an API server through a proxy, (iii) API name identified in a client request or message, (iv) API server to which a client message is transmitted by a proxy, and (v) IP address or port of a client.

API characteristics data definitions may comprise one or more of (i) client side name associated with an API, (ii) server side name associated with an API, (iii) hostname associated with an API, (iv) IP address of an API server, (v) TCP port associated with an API on an API server, (vi) login URL or secure URL associated with an API, (vii) cookie information, (viii) communication protocols supported by an API, (ix) protocol methods supported by an API, (x) content type supported by an API, and (xi) a data rate limit prescribed in connection with an API.

Configuration data may comprise one or more of (i) data port information or routing information corresponding an API server, (ii) load balancing or routing policies, (iii) load balancing or routing techniques, (iv) management ports, (v) maximum number of processes or threads for each port, (vi) policies for generating logs, and (vii) API security settings corresponding to an API server.

Session data may comprise one or more of (i) cookies, (ii) tokens, (iii) client ids and (iv) device ids.

Security data comprises one or more of (i) cipher suites, (ii) digital certificates, (iii) session keys and (iv) asymmetric and symmetric ciphers received at a proxy.

The invention additionally provides a system for securing one or more API servers, the system comprising (i) a proxy cluster configured for routing client messages to at least one target API implemented on the one or more API servers, the proxy cluster comprising a networked plurality of proxies, wherein each of the plurality of proxies are configured to (a) extract information identifying a target API from data packets corresponding to a received client message, and transmit the received client message to an API server implementing the target API, and (b) responsive to receiving an indicator of compromise, discard a received client message corresponding to a client or connection id associated with the received indicator of compromise, without onward transmission to an API server identified in the received client message, and (ii) a cluster of security servers comprising (c) a first security server configured: to receive a first set of information comprising proxy access log information from at least a first proxy within the proxy cluster, and to analyse the first set of information for identifying a first set of indicators of compromise, and (d) a second security server configured: to receive a second set of information comprising proxy access log information from at least a second proxy within the proxy cluster, and to analyse the second set of information for identifying a second set of indicators of compromise.

In a system embodiment, the cluster of security servers comprises a scalable plurality of stateless security servers.

The system may persist the first set of indicators of compromise and the second set of indicators of compromise to a database.

Each of the plurality of proxies may be configured to receive the first set of indicators of compromise and the second set of indicators of compromise.

The first security server may additionally be configured such that the first set of information received from at least the first proxy includes one or more of API characteristics data definitions, configuration data, session data and security data associated with at least the first proxy.

The second security server may additionally be configured such that the second set of information received from at least the second proxy includes one or more of API characteristics data definitions, configuration data, session data and security data associated with at least the second proxy.

The first and second security servers may respectively be configured for one or more of generating API metrics, generating blocked connection metrics, generating back end error code metrics, and identifying anomalies.

The invention provides a method for routing client messages to a target API, the method comprising (i) receiving a client message at a proxy router, (ii) extracting from data packets corresponding to the received client message, an API name and hostname corresponding to a target API, comparing the extracted API name against API names associated with each of a set of API characteristics data definitions, and (iv) responsive to a failure to identify an API characteristics data definition comprising an API name that matches the extracted API name, discarding the received client message, without onward transmission to an API server identified in the received client message.

The method may additionally responding to successful identification of an API characteristics data definition comprising an API name that matches the extracted API name, by (i) comparing at least one of a communication protocol, protocol method and content type specified within the received client message against one or more permitted communication protocols, permitted protocol methods or permitted content types associated with the identified API characteristics data definition, and (ii) responsive to determining that at least one of the communication protocol, protocol method or content type specified within the received client message does not match permitted communication protocols, permitted protocol methods or permitted content types associated with the identified API characteristics data definition, discarding the received client message without onward transmission to an API server identified in the received client message.

In a method embodiment, responsive to discarding a received client message without onward transmission to an API server identified in the received client message, an error message is returned to a client associated with the discarded client message.

The invention additionally provides a method for securing one or more API servers, the method comprising (i) receiving at a security server, data from a plurality of proxies within a proxy cluster, wherein (a) the proxy cluster is configured for routing client messages to at least one target API implemented on the one or more API servers, and (b) each of the plurality of proxies are configured to extract information identifying a target API from data packets corresponding to a received client message, and to transmit the received client message to an API server implementing the target API, (ii) identifying at the security server, one or more indicators of compromise, based on the data received from proxies within the proxy cluster, and (iii) responsive to receiving an indicator of compromise identified by the security server at a proxy within the proxy cluster, discarding a received client message corresponding to a client or connection id associated with the received indicator of compromise at said proxy, without onward transmission of said client message to an API server.

The method may further comprise one or more of generating API metrics, generating blocked connection metrics, generating back end error code metrics, and identifying anomalies at the security server. In an embodiment of the method, the data received from the proxies within the proxy cluster, includes (i) proxy access log information, and (ii) one or more of API characteristics data definitions, configuration data, session data and security data associated with the proxies.

For the purposes of the method, examples of proxy access log information include one or more of (i) time stamp information corresponding to one or more communications received at or sent from a proxy, (ii) connection id of a client communicating with a proxy, (iii) connection id of a client communicating with an API server through a proxy, (iii) API name identified in a client request or message, (iv) API server to which a client message is transmitted by a proxy, and (v) IP address or port of a client. It will however be understood that the above instances of proxy access log information, are exemplary and not exhaustive.

For the purposes of the method, API characteristics data definitions comprises one or more of (i) client side name associated with an API, (ii) server side name associated with an API, (iii) hostname associated with an API, (iv) IP address of an API server, (v) TCP port associated with an API on an API server, (vi) login URL or secure URL associated with an API, (vii) cookie information, (viii) communication protocols supported by an API, (ix) protocol methods supported by an API, (x) content type supported by an API, and (xi) a data rate limit prescribed in connection with an API. It will however be understood that the above instances of API characteristics data definitions, are exemplary and not exhaustive.

For the purposes of the method, configuration data comprises one or more of (i) data port information or routing information corresponding an API server, (ii) load balancing or routing policies, (iii) load balancing or routing techniques, (iv) management ports, (v) maximum number of processes or threads for each port, (vi) policies for generating logs, and (vii) API security settings corresponding to an API server. It will however be understood that the above instances of configuration data, are exemplary and not exhaustive.

For the purposes of the method, session data comprises one or more of (i) cookies, (ii) tokens, (iii) client ids and (iv) device ids. It will however be understood that the above instances of session data, are exemplary and not exhaustive.

For the purposes of the method, security data comprises one or more of (i) cipher suites, (ii) digital certificates, (iii) session keys and (iv) asymmetric and symmetric ciphers received at a proxy. It will however be understood that the above instances of security data, are exemplary and not exhaustive.

The invention further presents a method for securing one or more API servers, comprising (i) receiving at a first security server within a cluster of security servers, a first set of information comprising proxy access log information from at least a first proxy within a proxy cluster, (ii) analysing the first set of information for identifying a first set of indicators of compromise, (iii) receiving at a second security server within the cluster of security servers, a second set of information comprising proxy access log information from at least a second proxy within the proxy cluster, (iv) analysing the second set of information for identifying a second set of indicators of compromise, and (v) responsive to receiving an indicator of compromise at a proxy within the proxy cluster, discarding a received client message corresponding to a client or connection id associated with the received indicator of compromise, without onward transmission to an API server identified in the received client message—wherein the proxy cluster comprises a networked plurality of proxies, wherein each of the plurality of proxies is configured to extract information identifying a target API from data packets corresponding to a received client message, and to transmit the received client message to an API server implementing the target API.

In a method embodiment, the first set of indicators of compromise and the second set of indicators of compromise are persisted to a database.

The method may further comprise receiving the first set of indicators of compromise and the second set of indicators of compromise at each of the first proxy and the second proxy.

In a method embodiment, (i) the first set of information received from at least the first proxy includes one or more of API characteristics data definitions, configuration data, session data and security data associated with at least the first proxy, and (ii) the second set of information received from at least the second proxy includes one or more of API characteristics data definitions, configuration data, session data and security data associated with at least the second proxy.

The method may further comprise one or more of generating API metrics, generating blocked connection metrics, generating back end error code metrics based on said first and second sets of information.

In a more specific embodiment, in acquiring at least one of the first set of information and the second set of information at least one data plane within the first proxy or second proxy has a plurality of sub-processes uniquely associated therewith. Capture of real time API traffic data routed through such data plane may comprise generating, for each sub-process associated with said data plane, a log uniquely corresponding to said sub-process, wherein said log comprises real time API traffic data routed by said sub-process.

It would be appreciated that receiving access logs and API characteristics data definitions (and optionally configuration data, session data or security data) from across a plurality of proxies within a proxy cluster, enables a security server or cluster of security servers to determine and consolidate metrics, anomalies, indicators of compromise, error codes and blocked connection information with a cluster wide perspective (i.e. across all nodes of the proxy cluster) instead of on a proxy specific basis—which improves the results of data analysis and for better identification of indicators of compromise.

The invention additionally provides computer program product for implementing methods in accordance with the present invention, comprising a non-transitory computer usable medium having a computer readable program code embodied therein, the computer readable program code comprising instructions for implementing the various method steps.

BRIEF DESCRIPTION OF THE ACCOMPANYING DRAWINGS

FIG. 4 illustrates a networking architecture comprising a proxy incorporating API based routing and a security server in accordance with the present invention.

FIG. 10 illustrates an exemplary system in accordance with the present invention.

DETAILED DESCRIPTION

Figure 1:
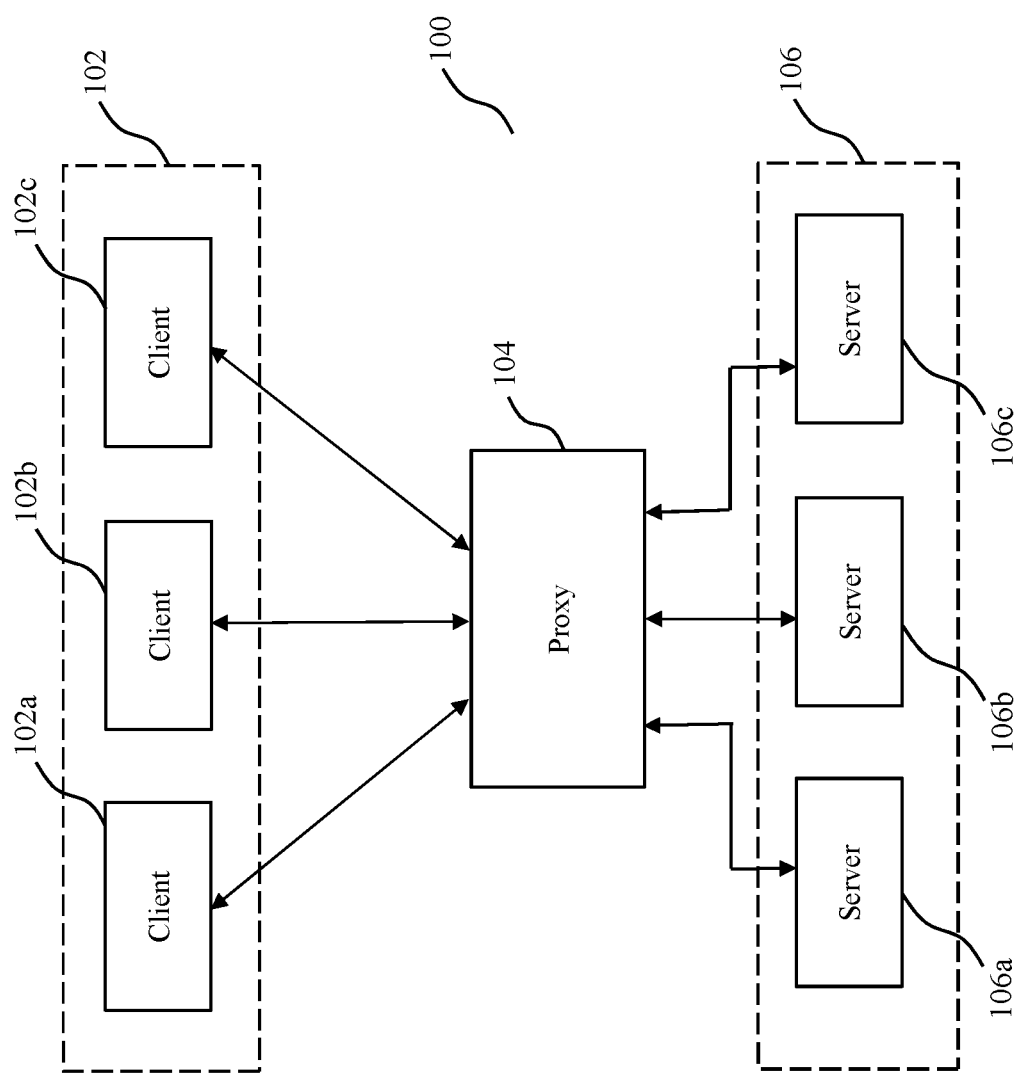
FIG. 1 illustrates a networking architecture comprising a proxy node positioned intermediate to clients and servers.
Figure 2:
FIG. 2 illustrates OSI protocol layers and corresponding TCP/IP protocol layers.

The present invention relates to the domain of proxies configured for routing of client requests or messages between multiple different APIs (either running on a single server or distributed across multiple servers), as well as between multiple instances of an API (running on a single server or distributed across multiple servers).

The present invention provides methods and systems for implementing API proxy based adaptive security. The invention implements said adaptive security to achieve improved backend API server security, while avoiding data bottlenecks and maintaining data throughput.

As described in further detail below, a first aspect of the invention involves a method of API security that may be employed by proxies within a proxy cluster, for implementing routing decisions (for example routing or load balancing decisions) involving client requests or messages received at said proxies. At a high level, the invention achieves this by receiving at a proxy within a proxy cluster, a client message designating a target API. The proxy extracts information from data packets corresponding to the client message, and compares the extracted information against a predefined set of information or information types associated with the target API. In the event of a mismatch between the extracted information and the predefined set of information or information types associated with the target API, the client message may be designated as a threat and rejected.

A second aspect of the invention involves generating or collecting at one or more proxies within a proxy cluster, log information that captures a predefined set of data corresponding to client messages and requests received at the one or more proxies. It also contains information from responses from API servers. The predefined set of data includes data that can be used to correlate various communications between a client, a proxy and a backend API server, and also includes data which can be used for the purposes of generating API metrics and identifying anomalies and/or indicators of compromise.

In a third aspect, the invention involves transmission of such predefined set(s) of data to a cluster of security servers, which security servers analyze the received data to generate API metrics and/or identify anomalies or indicators of compromise. The anomalies or indicators of compromise may be transmitted back to proxies within the proxy cluster, and may be used by proxies within the proxy cluster to terminate existing connections and block subsequent requests or messages from clients associated with the identified anomalies or indicators of compromise. Anomalies and indicators of compromise may be identified based on machine learning algorithms or techniques. In implementation, one or more machine learning algorithms or techniques may involve creating graphs corresponding to each parameter, identifying a baseline of acceptable variations of variable values, and identifying deviations (indicative of indicators of compromise or anomalies) from such baselines.

For the purposes of the invention "anomaly" shall mean any abnormal, unusual, unexpected or strange artifact, event or trend in API characteristics (for example, characteristics such as traffic volume, bandwidth use, protocol use etc.) that could potentially represent the presence of a threat or indicator of compromise. Anomalies are identified in comparison with a baseline of normal network or user behavior that has been established over a period of time. Once certain parameters have been defined as normal, departures from normal parameters or ranges may be flagged as anomalous.

For the purposes of the present invention "API server" shall mean any server running at least one instance of at least one API.

For the purposes of the invention "client" shall mean any device having information processing and network communication capabilities. The types of clients may vary widely and include but are not limited to desktop computers, laptop computers or notebook computers, personal digital assistants, handheld computers, cellular phones, servers and Internet of Things (IOT) sensors or servers, gateways, brokers or other such devices.

For the purposes of the invention "indicator(s) of compromise" shall mean an artifact or event in network characteristics that indicate with high confidence, unauthorized access or attempts to unauthorizedly access a system or data. Indicators of compromise are identified in comparison with a baseline of normal network or user behavior that has been established over a period of time. Once certain parameters have been defined as normal, departures from normal parameters or ranges may be flagged as indicators of compromise.

For the purposes of the invention "metrics" shall mean a set of measurements used to measure or reflect levels, types and quantum of API communications or web services or API traffic. Exemplary metrics may include performance characteristics such as number of request/response, client access URLs, number of user sessions/non sessions, most popular methods/client devices, details of server responses including error codes, timing information for access, session ids, delay, provisioning, availability, restoration times for outages, average and maximum outages periods, average and maximum response times, latency, and delivery rates (i.e., throughput), actual session Quality of Service (QoS), traffic routes, payload size, response time, cookie types, number of requests and end-user application transactions.

For the purposes of the present invention, "proxy" or "proxy node" shall mean any device having information processing and network communication capabilities that is configured to route communications from a client to a server and/or vice versa. The types of proxies may vary widely and include but are not limited to routers, load balancers, full proxies, half proxies, security proxies and TOT proxies.

For the purposes of the present invention, "proxy cluster" or "cluster of proxies" shall mean a plurality of proxies. For the purposes of the present invention, proxies within a proxy cluster may be understood as being interconnected in an overlay network.

For the purposes of the invention, "server" shall mean any device having information processing and network communication capabilities, and which is configured to provide one or more services to a requesting client, over a communication network. The types of servers may vary widely, and include but are not limited to API servers, application servers, microservices, web servers, FTP servers, IOT brokers or gateways, message brokers, or service oriented architecture (SOA) servers.

For the purposes of the invention, "server backend" shall mean a set of one or more servers.

Figure 3:
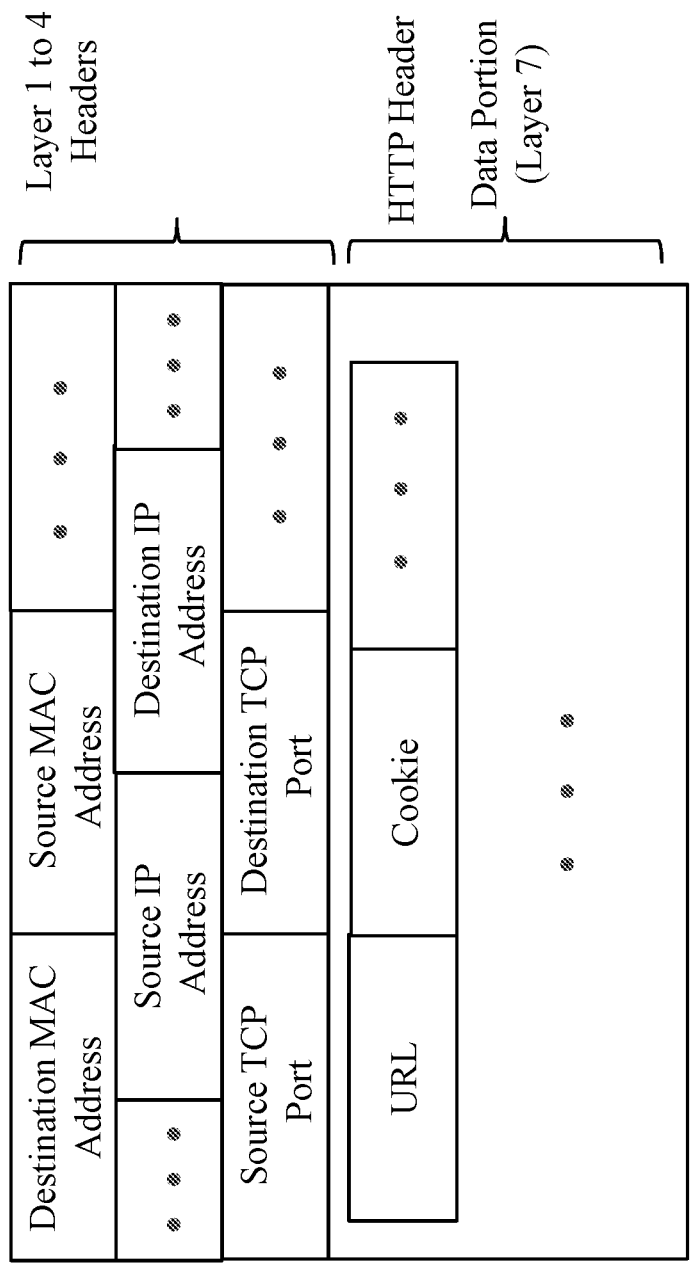
FIG. 3 illustrates headers of an IP packet.

FIG. 4 illustrates a network architecture 400 having proxy 404 disposed as a network intermediate between client(s) 402 and server backend 406. Server backend 406 comprises servers 4060, 4062 and 4064. Server 4060 is illustrated as running instances of two APIs—namely, API 1 (4060a) and API 2 (4060b). Server 4062 is illustrated as running instances of two APIs—namely, API 3 (4062a) and API 4 (4062b). Server 4064 is illustrated as running instances of two APIs—namely, API 3 (4064a) and API 2 (4062b). It would be clear from FIG. 3 that server 4062 and server 4064 are each running a separate instance of API 3 (i.e. 4062a and 4064a) and that server 4060 and server 4064 are each running a separate instance of API 2 (i.e. 4060b and 4064b). It would also be understood that the distribution of two APIs per server is only illustrative and is not intended to be limiting and that the number of servers within the server backend is also only illustrative and not limiting.

Proxy 404 is an embodiment of a proxy configured for API based routing functions (for example, routing or load balancing functions) among API servers. Proxy 404 comprises a proxy router 4042 and a synchronization controller 4040. Proxy 404 may additionally include or enable access to one or more repositories of data associated with proxy 404, said repositories of data comprising (i) API characteristics data 4044, (ii) configuration data 4046, (iii) session data 4048, and (iv) security data 4050. One or more repositories comprising the above data may in various embodiment of the invention be accessible by one or both of proxy router 4042 and synchronization controller 4040.

API characteristics data 4044 comprises information identifying one or more characteristics of each API implemented within the server back end. In an embodiment of the invention illustrated in FIG. 4, API characteristics data 4044 includes a unique set of API characteristics data definitions (API 1 data (4044a), API 2 data (4044b), API 3 data (4044c) and API 4 data (4044d)) corresponding to each distinct API (i.e. to API 1 (4060a), API 2 (4060b, 4064b), API 3 (4062a, 4064a) and API 4 (4062b)) implemented within the server backend. In the illustration of FIG. 4, server backend implements 4 distinct APIs, namely API 1 (4060a), API 2 (4060b and 4064b), API 3 (4062a and 4064a), and API 4 (4062b). Each of APIs 1 to 4 accordingly has a corresponding unique API characteristics data definition within API characteristics data 4044, namely (i) API 1 has corresponding API characteristics data definition 4044a, (ii) API 2 has corresponding API characteristics data definition 4044b, (iii) API 3 has corresponding API characteristics data definition 4044c, and (iv) API 4 has corresponding API characteristics data definition 4044d.

Exemplary non-limiting API characteristics defined within each API characteristics data definition may include one or more of: (i) client side name associated with the API (i.e. external API name), (ii) server side name associated with the API (i.e. internal API name), (iii) hostname associated with the API, (iv) IP address of API server, (v) TCP port associated with the API on said API server, (vi) login URL or secure URL associated with the API, (vii) cookie information, (viii) communication protocols supported by the API (e.g. HTTP, WebSocket, MQTT, CoAP, etc.), (ix) HTTP methods or other protocol methods supported by the API (e.g. GET, POST, PUT, DELETE for HTTP, Streaming for WebSocket, Publish/Subscribe for MQTT etc.), and (x) content type supported by the API.

In an embodiment where multiple instances of an API are being implemented across multiple servers, or within a single server, an API characteristics data definition corresponding to such API may include the IP address of each API server that is being used to implement each instance of the API, as well as the TCP port associated with each instance of the API.

In a preferred embodiment of the present invention, each API characteristics data definition may associate (and internally map) two API names with each API. One of the API names is an external API name, which API name is made available to clients and/or client applications i.e. the API name by which the API is referred in client requests or messages. The other API name is an internal API name, which is the server side name for said API i.e. which is the API name associated with the API at the server backend, and which is used by the proxy when communicating with the API at the server backend. The internal API name is not exposed to clients. In operation, an external API name be identified at a proxy, based on information extracted from a client request or message. This external API name may be matched with external API names within various API characteristics data definitions, until a matching API characteristics data definition is found (i.e. until an API characteristics data definition having an external API name that matches the external API name extracted from the client request or message is found). The internal API name corresponding to the matching API characteristics data definition may thereafter be used to transmit the client request or message onward to the target API.

The internal-external API naming configuration presents security related advantages, which are discussed in further detail hereinafter. Additionally, this internal-external API naming configuration ensures that a backend API can be replaced or substituted with a new API at any point of time (by simply changing the internal-external API name mapping within the API characteristics data definition), without having to inform or update client devices regarding the replaced or substituted API.

In an embodiment of the invention, each API characteristics data definition may comprise a data file uniquely associated with an API, or a set of data records uniquely associated with an API Exemplary non-limiting instances of configuration data 4046 comprise configuration information that proxy 404 requires to effect routing of incoming client requests or messages to an API server within the server backend. In an embodiment of the invention, configuration data 4046 may comprise one or more of (i) data port information and/or other routing information 4046a corresponding to one or more servers within a server backend, (ii) load balancing or routing policies 4046b, (iii) load balancing and/or routing techniques 4046c, (iv) management ports, (v) maximum number of processes or threads for each port, (vi) policies for generating logs (i.e. policies regarding what events or information to log, event triggers for logging and log persistence and/or management policies) and (vii) API security settings corresponding to one or more API servers within the server backend.

Exemplary non-limiting instances of session data 4048 comprise information identifying one or more characteristics of users or clients communicating through proxy 404. In an embodiment of the invention, session data 4048 comprises one or more of (i) cookies, (ii) tokens, (iii) client ids and (iv) device ids. In a more specific embodiment of the invention, session data 4048 may be limited to information that is active (i.e. that has not expired) in accordance with session expiry policies of one or more API servers within the server backend 406.

Exemplary non-limiting instances of security data 4050 comprise Transport Layer Security/Secure Sockets Layer (TLS/SSL) security data corresponding to each session that is active (i.e. that has not expired) in accordance with applicable session expiry policies. In an embodiment of the invention, security data 4050 may comprise one or more of cipher suites, digital certificates (including one or more of server name, a trusted certificate authority (CA) and a backend server's public encryption key), session keys and/or asymmetric and symmetric ciphers that have been received at proxy 404.

In addition to the above, while not illustrated in FIG. 4, proxy 404 may additionally include information identifying all other live or active proxy nodes (i.e. proxy nodes other than proxy 404) within a cluster of proxies. In an embodiment of the invention, this information may include one or more of hardware identification information, IP address information and/or network routing information corresponding to such other live or active proxy nodes within the cluster of proxies.

Proxy 404 may also include a data packet parser (not shown in FIG. 4) configured to parse at least API data from data packets corresponding to a received client request or message.

Proxy 404 includes proxy router 4042, which may be configured to (i) receive client requests or client messages, and (ii) respond to received requests or messages satisfying one or more predefined criteria, by transmitting said requests or messages onward to an appropriate API within one or more API server(s) within the server backend. Proxy controller 4042 is a controller configured to implement routing or load balancing of client requests or messages received at a proxy node—to ensure that legitimate client requests or messages are transmitted onwards to an API server configured to implement an API identified in the client request or message.

In embodiments of the invention where the network architecture comprises a cluster of switches, proxy 404 may additionally comprise a processor based synchronization controller 4040 that is configured to respond to a predefined synchronization event or synchronization trigger by synchronizing one or more of (i) a data state of one or more of API characteristics data 4044, configuration data 4046, session data 4048, security data 4050 and information identifying other live or active proxy nodes, with (ii) a data state of corresponding API characteristics data, configuration data, session data, security data and/or information identifying other live or active proxy nodes, associated with another proxy node within the proxy cluster. In an embodiment of the invention, synchronization controller 4040 is configured to synchronize data states of more than one (and preferably all) of API characteristics data 4044, configuration data 4046, session data 4048, security data 4050, and information identifying other live or active proxy nodes, with (ii) data states of corresponding API characteristics data, configuration data, session data, security data, and information identifying other live or active proxy nodes within the switch cluster. It would be understood that in an embodiment of the invention, synchronization of data states may involve synchronization of state changes that have occurred since a previous synchronization event.

In an embodiment of the invention, proxy 404 may be configured so as to implement (i) a control plane comprising a processor implemented control process, and (ii) one or more data planes, each data plane comprising a discrete processor implemented balancer process.

The control plane or control process may be configured for one or more of:

- Receiving a new API characteristics data definition corresponding to each new API for which proxy 404 is configured to route client requests or messages. In an embodiment, each new API characteristics data definition may be received through a command line interpreter (CLI) or a RESTful API (REST API).
- Validating each received new API characteristics data definition based on a prescribed API characteristics data definition schema and/or one or more validation rules.
- Persisting validated API characteristics data definitions in a repository associated with or accessible by a proxy.
- Synchronizing repositories associated or accessible by each proxy in a proxy cluster so that all proxies within the proxy cluster have access to validated and persisted API characteristics data definitions.
- Monitoring cookies and other session data at each proxy within the proxy cluster and synchronizing all proxies within the cluster to share cookie data and other session data.
- Monitoring health of each data plane and raising alerts in case a balancer process associated with a data plane crashes or is rendered inoperative.

Each data plane or balancer process may be configured for one or more of:

- Comparing data parsed from data packets associated with a client request or message, with data in API characteristics data definitions, and identifying an API characteristics data definition corresponding to a target API.
- Implementing routing or load balancing decisions based on contents of an identified API characteristics data definition that corresponds to a target API.
- Implementing authentication steps involving comparison between (i) request or message parameter information (for example information extracted at step 704) against (ii) corresponding parameter information specified within the matching API characteristics data definition (for example as identified at step 706) and rejecting client requests or messages that fail one or more authentication steps.
- Implementing two-stage rate limiting protection for API servers comprising (i) front end rate limiting—comprising blocking client messages or requests associated with an IP address that has exceeded a predefined threshold for API accesses per unit time, combined with (ii) back end rate limiting—comprising proxy node based limiting of delivery of client messages to an API, API server or API server cluster that has exceeded a predefined number of client messages or requests that said API, AI server or API server cluster can process simultaneously. The front end rate limiting may in an embodiment be implemented on an individual proxy node basis, based on information regarding the number of client messages received at the individual proxy node from a specific IP address. The back end rate limiting may in an embodiment be implemented based on a proxy-cluster wide basis, based on information aggregated (through synchronization of proxy nodes) from all nodes regarding the total number of client messages or requests being processed by an API, API server or API server cluster.
- Checking cookies and other session data, and implementing load balancing decisions based on such cookies and/or session data.

By implementing separate and independent processes for the control plane and the one or more data planes, the invention improves high availability as well as scalability. Additionally, the separation of control and data planes improves security of the system, by enabling the control plane to continue to operate in isolation despite security attacks on one or more data planes.

Additionally in an embodiment of the invention, proxy 404 may be configured to implement asynchronous message based inter process communication (IPC) between the control plane and each data plane. As a consequence of the plurality of data planes, this enables proxy 404 to operate asynchronously—for the reason that while a proxy waits for a response from any target API or API server hosting a target API, it can move on to execution of a next process or can communicate with another target API or with an API server hosting another target API.

In an embodiment of the invention, proxy 404 (or each proxy within a proxy cluster) may be configured to initialize a new data plane (i.e. a new balancer process) for each additional protocol (e.g. HTTP, HTTPS, WebSocket, MQTT or CoAP) or TCP port supported by the proxy. A proxy 404 (or each proxy within a proxy cluster) may further be configured to initialize a plurality of sub-processes associated with each data plane. The plurality of sub-processes enables a proxy to receive and simultaneously handle a larger number of client requests or messages, and improves utilization of underlying device resources (e.g. processor capacity, I/O and memory)—thereby improving high availability as well as scalability.

In an embodiment of the invention, proxy 404 may additionally be provisioned with a REST API configured to enable queuing of requests to a particular API server, until the API server becomes available. Requests for a particular API server may be queued at proxy 404 and only forwarded to the API server when its availability is confirmed (for example by pinging the server until a response is received from the server). Such queuing at proxy 404 further enables asynchronous communication between the proxy and clients.

Figure 5A:
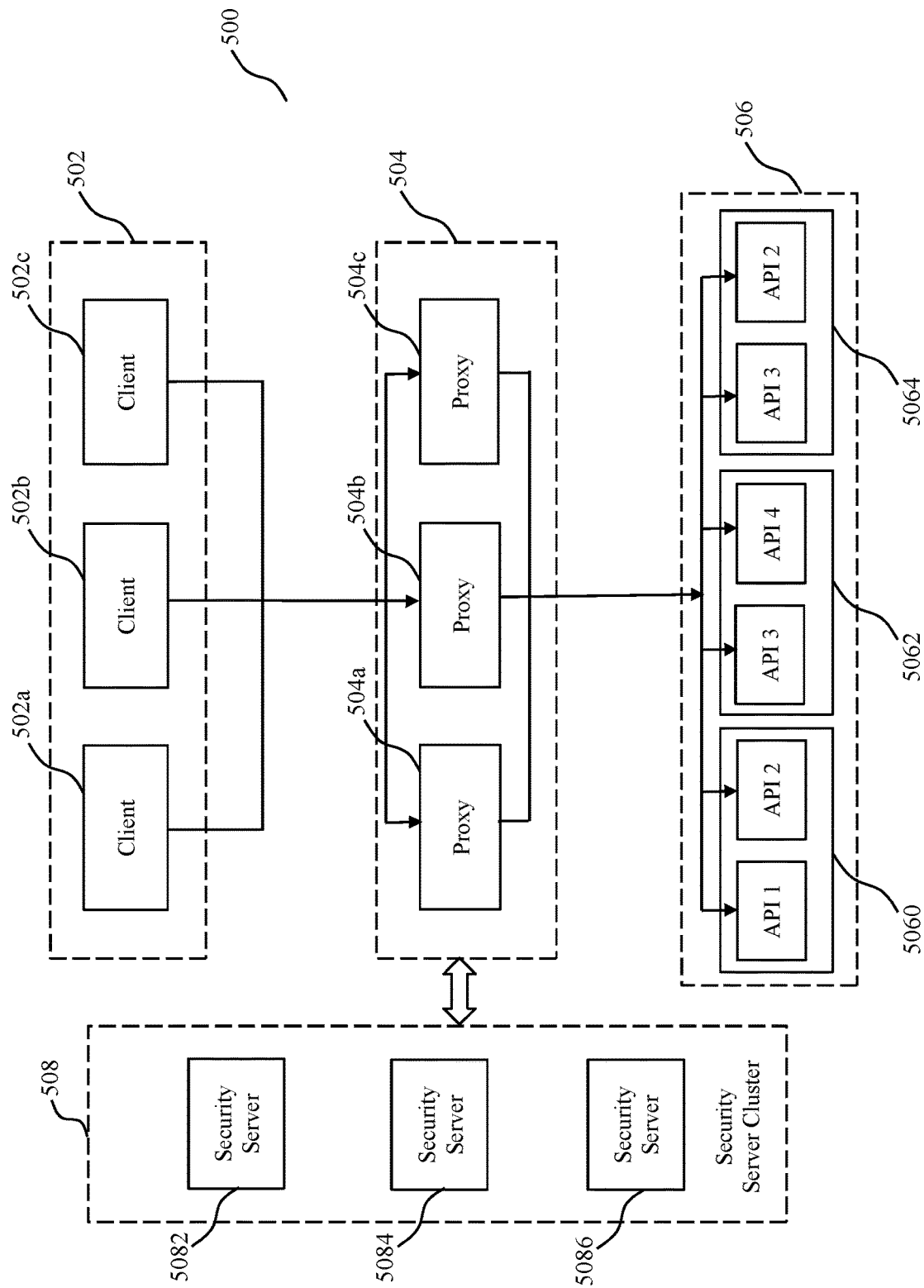
FIGS. 5A to 5C illustrate networking architectures comprising a scalable cluster of proxies and a security server cluster.

FIG. 5A illustrates a network architecture, wherein proxy cluster 504 is disposed as a network intermediate between clients 502 (i.e. clients 502a, 502b and 502c) and API server backend 506 (i.e. API server 5060 (comprising API 1 and API 2); API server 5062 (comprising API 3 and API 4); and API servers 5064 (comprising API 3 and API 2)). Each client request or client message directed towards server backend 506, and each response from server backend 206 is routed through proxy cluster 504.

As illustrated in FIG. 5A, proxy cluster 504 comprises a plurality of proxy nodes (i.e. proxies 504a, 504b and 504c). A client request or message for an API implemented on an API server within server backend 506 is routed to a proxy within proxy cluster 504. Based on API characteristics data available to the specific proxy, the proxy may route the client request to an appropriate API implemented at an API server within server backend 206. Responses from an API server to the client request or message are likewise transmitted from the API server back to the specific proxy, and onward from the specific proxy to the client from which the request or message originated.

The decision to route a client request or message to a specific proxy within proxy cluster 504, may in an embodiment of the invention be based on routing logic or routing policies within a DNS server or other name server (not shown). Exemplary load balancing parameters that the routing policies of the DNS server may rely on for selecting a specific proxy within proxy cluster 504 may include one or more of: location of the requesting client, location of the target API server(s), present load balance among proxies within the proxy clusters, content and/or type of request etc.

Selection of a target API and target API server (within server backend 506) by a proxy within proxy cluster 504 may be determined in accordance with the method discussed in more detail subsequently in connection with FIG. 7. In a specific embodiment of the invention, a plurality of proxies within proxy cluster 504 (and preferably all proxies within proxy cluster 504) may be configured to use identical methods for selecting a target API server—thereby ensuring that a specific client request or message will undergo identical routing/onward transmission by a proxy within proxy cluster 504, regardless of which proxy (within the proxy cluster) the client request or message is received at.

Figure 5B:
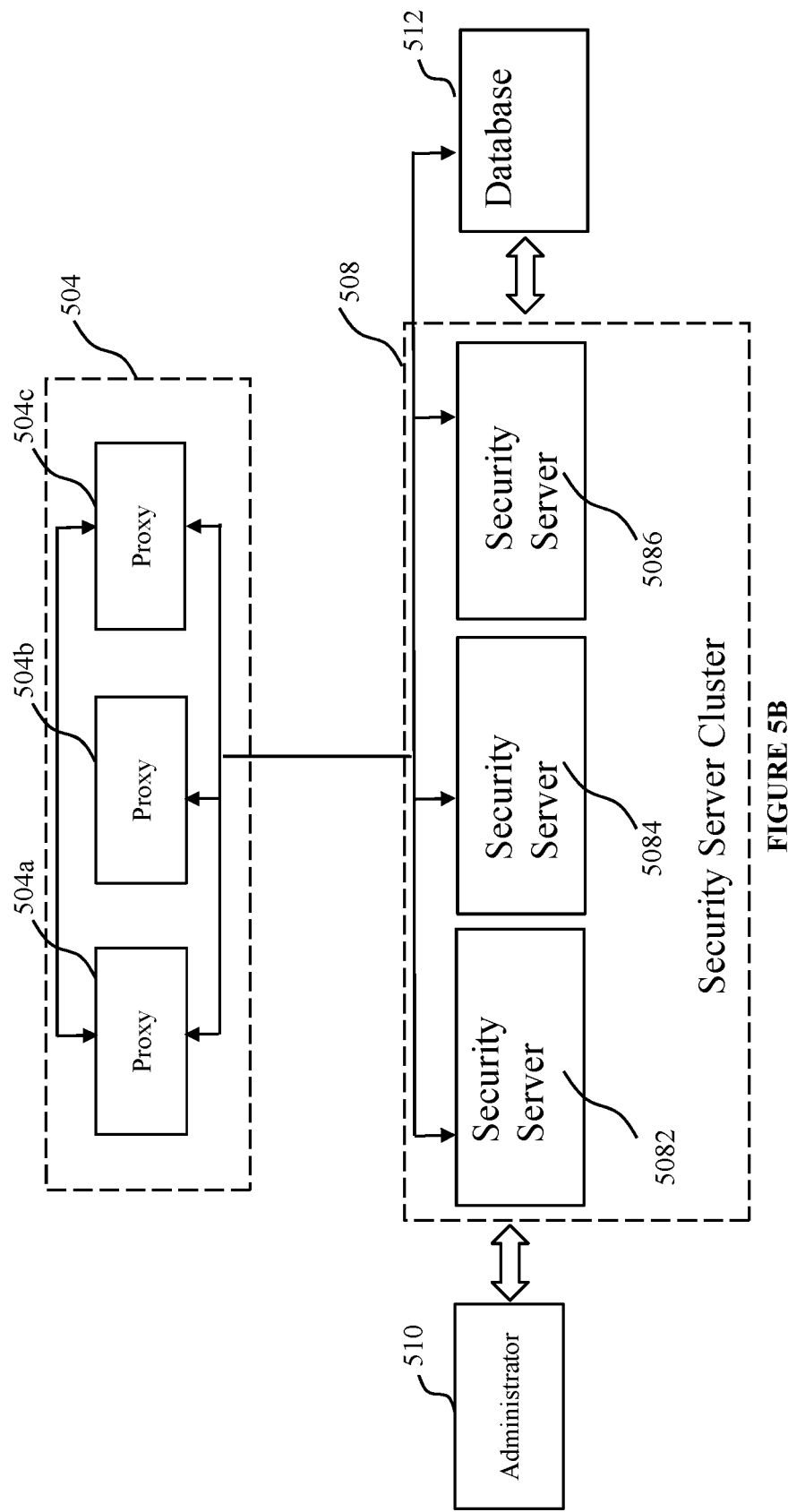
Figure 5C:
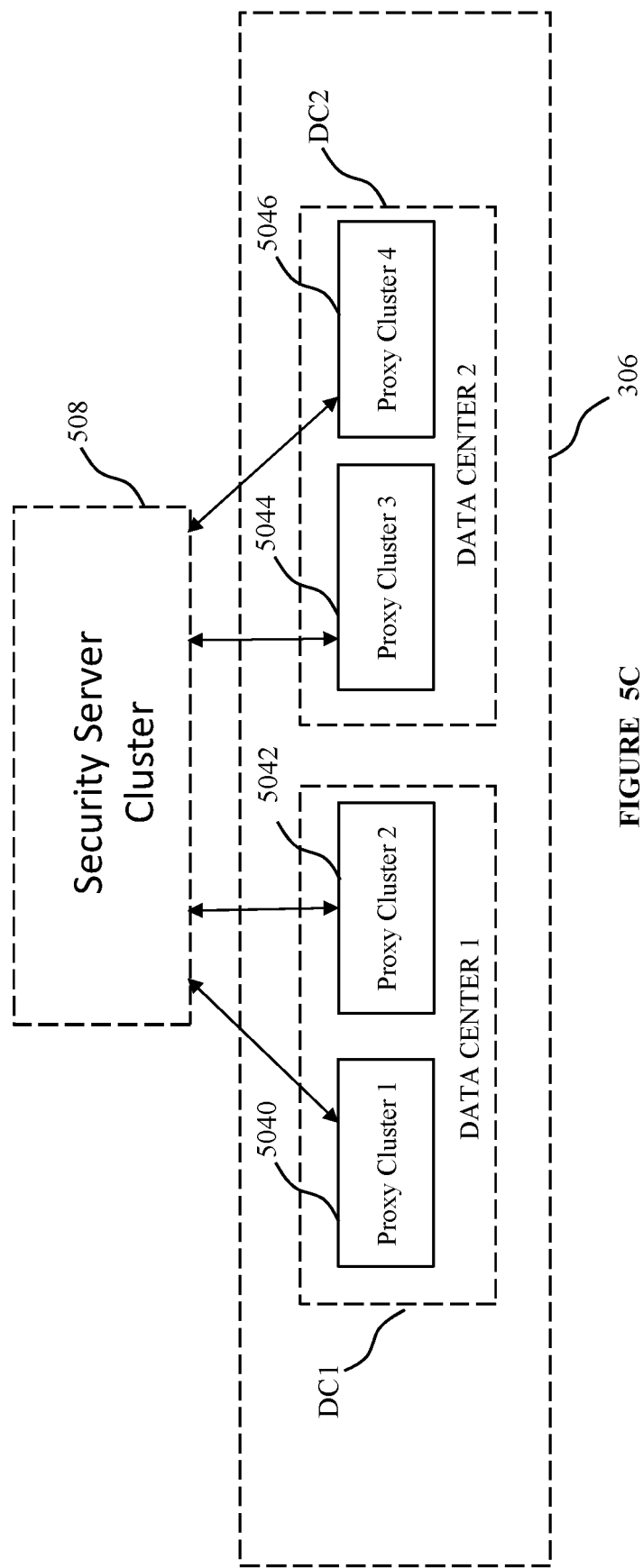
Figure 6:
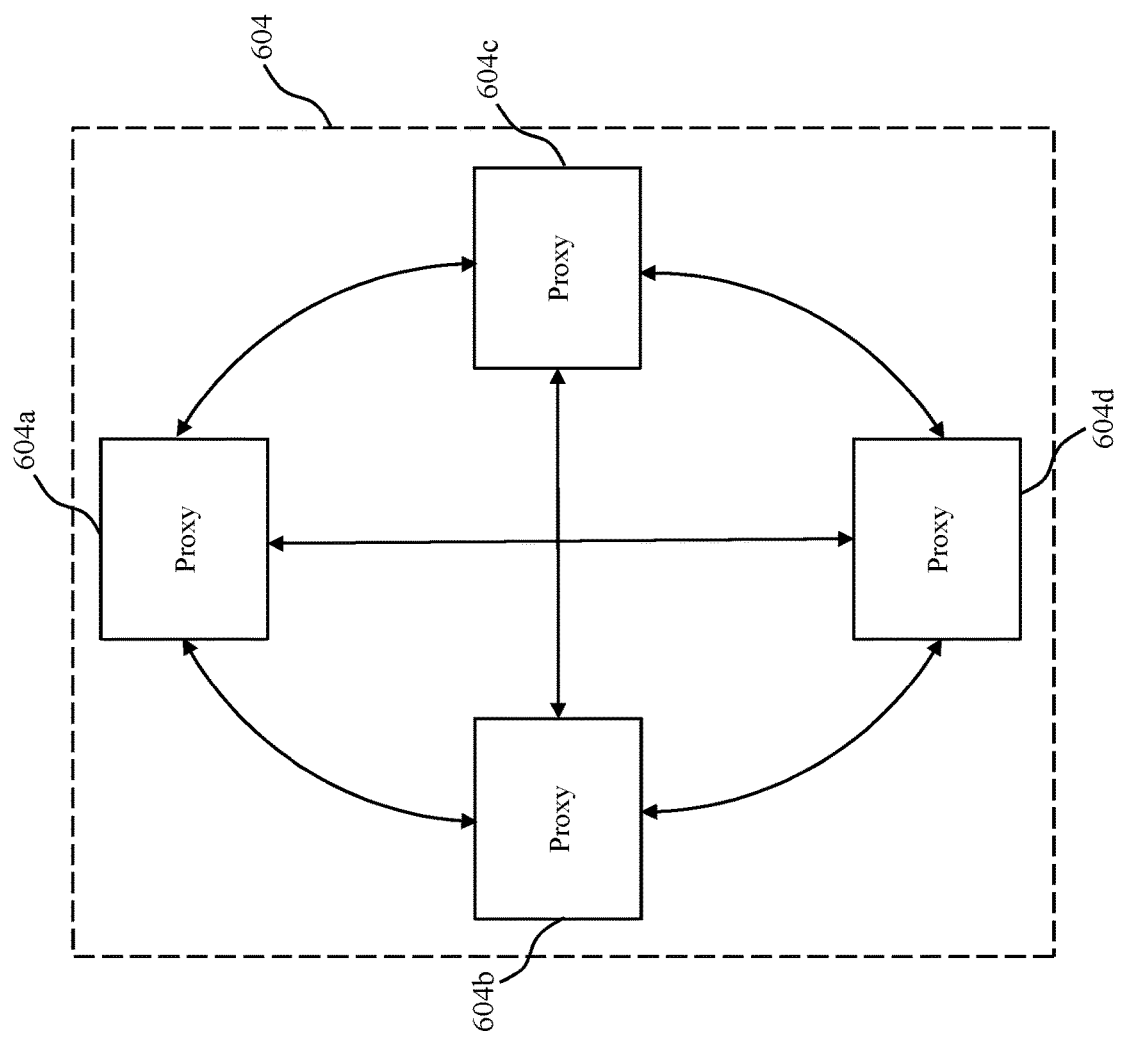
FIG. 6 illustrates a peer-to-peer network configuration of a cluster of proxies.

FIG. 6 illustrates an embodiment of the invention where proxy cluster 604 comprises four proxies 600*a* to 600*d*. It would be understood that the selection of a proxy cluster comprising four proxies is simply exemplary and that proxy cluster 604 may comprise any number of proxies. Each proxy 604*a* to 604*d* within proxy cluster 604 may comprise an instance of proxy 404 discussed previously in connection with FIG. 4. Accordingly, the synchronization process between proxies 604*a* to 604*d* may result in all proxies within proxy cluster 604 having identical data states corresponding to one or more (and preferably all) of API characteristics data 4044, configuration data 4046, session data 4048, security data 4050 and information identifying other live or active proxy nodes within the cluster. As illustrated in FIG. 5, the synchronization of data states between proxy nodes results in a peer-to-peer synchronization configuration within proxy cluster 604—wherein each proxy 604*a* to 604*d* is a peer node within the peer-to-peer synchronization configuration.

In an embodiment of the invention, each proxy within a proxy cluster periodically carries out a heartbeat messaging procedure (i.e. a ping-pong message/response procedure) with all other switches and updates its list of active peer nodes (i.e. the information identifying other live or active proxy nodes) depending on whether the heartbeat messaging procedure returns an error.

Figure 7:
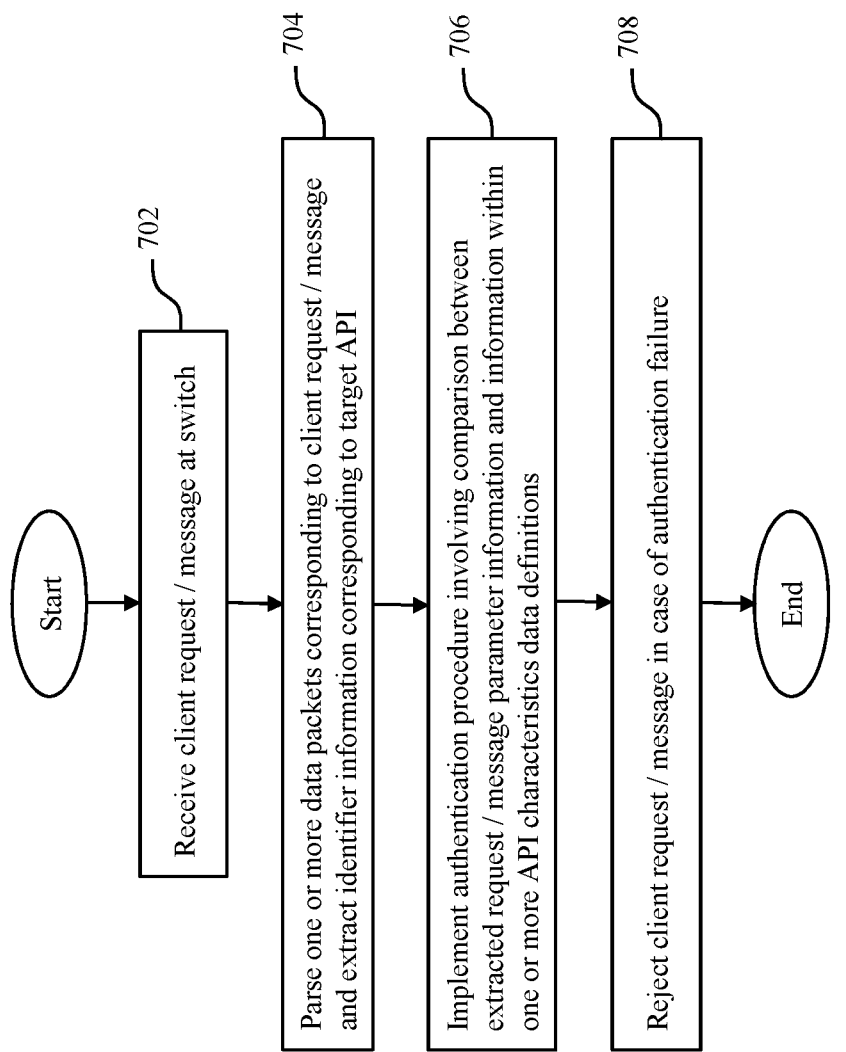
FIG. 7 illustrates a method of API security employed by a proxy.

FIG. 7 illustrates a method of API security authentication that may be employed by proxies of the present invention, in implementing switching decisions (for example routing or load balancing decisions) involving client requests or messages received at said proxies.

Step 702 comprises receiving a client request or message at a proxy (for example proxy 404). Step 704 thereafter comprises parsing one or more data packets corresponding to the received client request or message, and extracting request or message parameter information. In an embodiment of the invention, parsing of the data packets may be implemented by a data packet parser within the proxy. The request or message parameter information extracted from parsed data packets may in an embodiment comprise parameter information extracted from API data within the received data packets.

In an embodiment of the invention, the parameter information extracted at step 704 may comprise at least one of a target API name and a hostname associated with the target API. The parser may optionally extract one or more of cookie information, communication protocols used or identified, HTTP methods or other protocol methods used or identified, and content type used or identified in the request/message.

Step 706 comprises implementing an authentication procedure involving a comparison between extracted request or message parameter information (from step 704) and information within one or more API characteristics data definitions. The authentication procedure may be implemented based on one or more predefined set of authentication rules. In case the authentication procedure results in an authentication failure, step 708 comprises rejecting or discarding the client request or message (i.e. without transmitting said request or message onward to the server backend) optionally with an error message returned to the client. On the other hand if the client request or message is successfully authenticated, the request or message may be transmitted onward to a target API at the server backend.

In an embodiment of step 706, the authentication procedure comprises one or more of:

API name enforcement: matching an external API name extracted from the client request or message (for example a HTTP, WebSocket, MQTT or CoAP protocol based request or message) against external API names corresponding to each available API characteristics data definition available within or associated with a proxy—wherein failure to identify an API characteristics data definition having a matching external API name comprises an event of authentication failure. It would be understood that in an embodiment, the external API name and internal API name may be identical.

Protocol enforcement: subsequent to identification of an API characteristics data definition having a matching API name, matching a communication protocol (for example, a HTTP, WebSocket, MQTT or CoAP protocol) identified from data packets corresponding to the client request or message with one or more permitted communication protocols identified or listed in the identified API characteristics data definition—wherein a non-match event between a communication protocol identified from the client request or message and the one or more communication protocols identified or listed in the API characteristics data definition comprises an event of authentication failure.

Method enforcement: subsequent to identification of an API characteristics data definition having a matching API name, matching a protocol method (for example, a HTTP, WebSocket, MQTT or CoAP protocol methods) identified from data packets corresponding to the client request or message with one or more permitted protocol methods identified or listed in the API characteristics data definition—wherein a non-match event between a protocol method identified from the client request or message and the one or more permitted protocol methods identified or listed in the identified API characteristics data definition comprises an event of authentication failure.

Content type enforcement: subsequent to identification of an API characteristics data definition having a matching API name, matching a requested content type (for example, content requested within a HTTP, WebSocket, MQTT or CoAP protocol based request) identified from data packets corresponding to the client request or message with one or more permitted content types identified or listed in the identified API characteristics data definition—wherein a non-match event between a requested content type identified from the client request or message and the one or more permitted content types identified or listed in the identified API characteristics data definition comprises an event of authentication failure.

By implementing API security based on one or more of API name enforcement, protocol enforcement, method enforcement and content type enforcement, a proxy node may be configured to discard or reject client requests or messages that do not comply with one or more predefined authentication requirements. By rejecting such requests or messages before they reach the server backend, the proxy node improves the security configuration of the server backend and of APIs within the server backend. In addition to the authentication methods described above, a proxy node may optionally rely on cookie information within a client request or message and/or a specified data rate limit in arriving at a decision regarding authentication and onward transmission of the request or message to an API at the server backend.

In addition to the above methods of authentication implemented by proxy nodes within proxy cluster, one or more proxy nodes may additionally be configured to sanitize error messages received from API servers in response to a client message. Error messages received from servers, if communicated directly to a client can provide the client with significant amounts of information that can be misused by a user or client to bypass API security mechanisms or to circumvent server security mechanisms. The present invention addresses this problem by including within API characteristics data definitions corresponding to one or more (and preferably each) API, information (e.g. rules or mapping information) that enable a proxy to respond to receipt of error information from an API or API server implementing an instance of said API by either (i) modifying the error information received from the API or API server (for example by reducing the amount of error information or by redacting certain error information) prior to onward transmission of an error message to a client or (ii) replacing the error information received from the API or API server with a predefined or templatized error message for onward transmission to a client. The modification or replacement of error information fro each API may be based on rules or mapping information provided within the API characteristics data definition corresponding to said API.

Reverting to FIG. 4, in the illustrated embodiment, proxy 404 is in network communication with security server 408 configured to receive API data from proxy 404 and to enable implementation of API security with respect to server backend 406. In an embodiment of the invention, security server 408 may be configured to implement the method of securing a server backend shown in FIG. 8.

Figure 8:
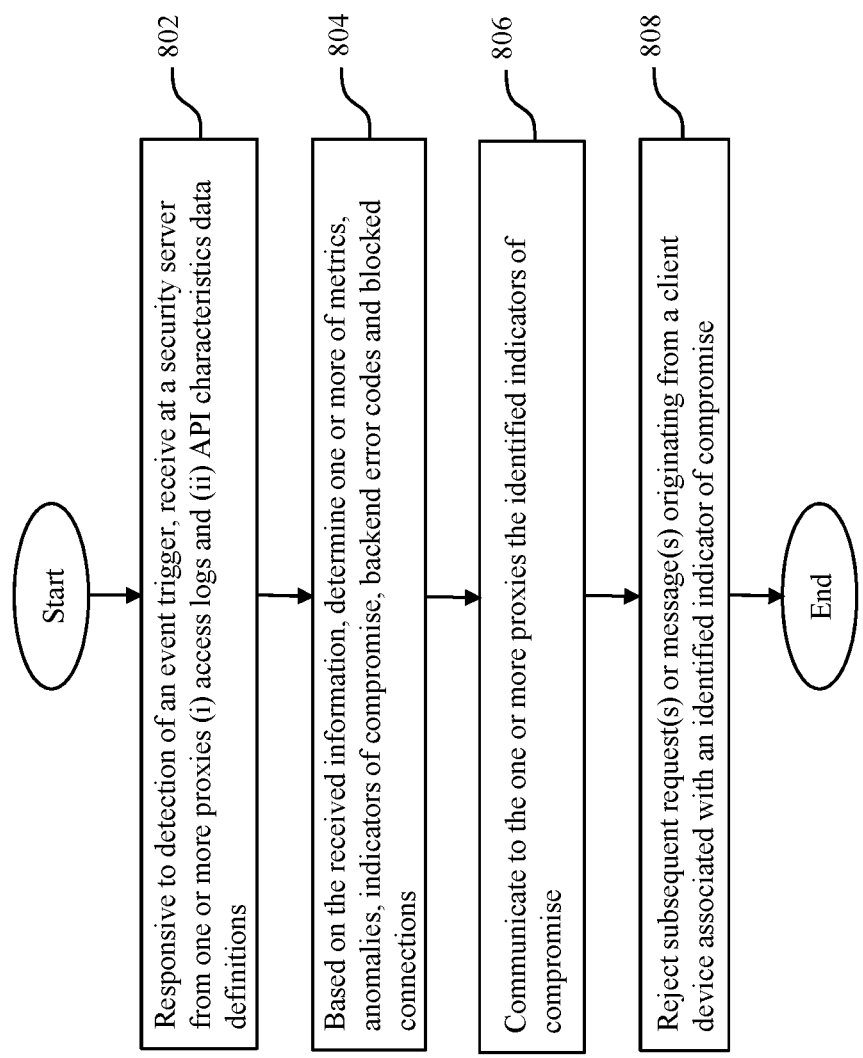
FIGS. 8 and 9 illustrate methods of securing a server backend.

FIG. 8 illustrates a method of securing a server or server backend, including in certain embodiments a server backend comprising one or more API servers. It would be understood that the method of FIG. 8 may be implemented by a security server 408 that is in network communication with one or more than one proxies 404 of the type illustrated in FIG. 4.

At step 802, responsive to a trigger event, security server 408 receives from one or more than one proxies 404, (i) proxy access log information and (ii) API characteristics data definitions corresponding to the proxies. In an embodiment, security server 408 may additionally receive one or more of configuration data, session data and security data corresponding to the proxies.

The trigger event may comprise any one or more triggers, including a periodic elapse of time based trigger. In an embodiment of the invention, the trigger event may comprise an elapse of time based trigger configured to trigger and reset upon elapse of a predetermined period of time—which in an embodiment may be any period of time between 30 seconds and 24 hours.

Exemplary instances of proxy access log information may comprise one or more of (i) time stamp information corresponding to one or more communications received at or sent from a proxy, (ii) connection id of a client communicating with a proxy, or with the server backend through the proxy, (iii) API name identified in a client request or message, (iv) API server to which a client request or message is transmitted by a proxy, (v) IP address and port of a client, (vi) client device, (vii) user agent, (viii) access URL, (ix) protocol) and/or protocol method (x) SSL information, (xi) header information, (xii) payload (if relevant), (xiii) error information, (xiv) response code, (xv) server errors. The above instances of proxy access log information are however exemplary and not exhaustive.

It would be understood that by recording connection ids of clients communicating with a proxy in respect of each client message or request, the invention enables tracking and correlation of all communications associated with a particular client message or request (e.g. the message from the client to proxy, onward transmitted message from proxy to server, response from server to proxy and onward transmitted response from proxy to client)—thereby enabling a consolidated tracking of incoming and outgoing communications through the proxy cluster, for security and monitoring purposes.

As discussed above, exemplary non-limiting API characteristics defined within each API characteristics data definition may include one or more of: (i) client side name associated with the API (i.e. external API name), (ii) server side name associated with the API (i.e. internal API name), (iii) hostname associated with the API, (iv) IP address of API server, (v) TCP port associated with the API on said API server, (vi) login URL or secure URL associated with the API, (vii) cookie information, (viii) communication protocols supported by the API (e.g. HTTP, WebSocket, MQTT, CoAP, etc.), (ix) HTTP methods or other protocol methods supported by the API (e.g. GET, POST, PUT, DELETE for HTTP, Streaming for WebSocket, Publish/Subscribe for MQTT etc.), and (x) content type supported by the API.

At step 804 the security server analyses information within the received access logs and API characteristics data definitions (and optionally within one or more of received configuration data, session data and security data corresponding to the proxies), and based on such analysis and one or more machine learning algorithms may generate, identify or consolidate information relating to one or more of:

access log tracking—i.e. correlating connection ids of clients with API usage metrics—i.e. one or more measurements of levels, types and quantum of services requested from or provided by the server backend through the one or more proxies with which the security server is in network communication. Exemplary metrics may include metrics corresponding to API name usage, API url usage, total requests, successes, sessions, non-sessions, most popular method, most popular device and most popular IPs anomalies—i.e. one or more abnormal, unusual, unexpected or strange artifacts, events or trends in network characteristics (for example, characteristics such as traffic volume, bandwidth use, protocol use etc.) that could potentially indicate the presence of a threat or indicator of compromise. Exemplary anomaly metrics may include total anomalies, most suspicious protocol methods, most suspicious device and most suspicious IPs indicators of compromise—i.e. one or more artifacts or events in network characteristics that indicate with high confidence unauthorized access or attempts to achieve unauthorized access to a system or data.

analysis of back end error codes—i.e. analysis of error codes returned by API servers within a server backend in response to an error associated with a client request or message. Exemplary error code metrics may include what is the most frequent error code, how many errors, what can be causing the error (e.g. time, device type, load etc.).

blocked connections—clients that have been blocked by one or more proxies. Exemplary blocked connection metrics may include identity of devices or users that are blocked, reasons for blocking and statistics of blocking corresponding to various methods of blocking— wherein exemplary methods of blocking include:

IOC—IP based blocking (based on indicators of compromise)

IOC—cookie based blocking (based on indicators of compromise)

API—protocol based blocking

API—method based blocking

API—content type based blocking

API—host name based blocking

API—name based blocking

Spike threshold (spikes in number of client side requests received per unit time) based blocking In implementation, the one or more machine learning algorithms discussed above may involve one or more of (i) dynamically creating a graph corresponding to each variable parameter (i.e. each parameter considered relevant for identifying or generating metrics, anomalies or indicators of compromise), (ii) identifying a baseline of acceptable variations of variable values, and (iii) identify deviations (indicative of indicators of compromise or anomalies) from such baselines.

At step 806, security server 408 communicates to the one or more proxies 404, one or more indicators of compromise identified at step 804, preferably along with a client device id or a connection id associated with each indicator of compromise. Each of the one or more proxies 404 may be configured to reject or discard one or more (and preferably all) subsequent client requests or messages from a client id or connection id associated with an indicator of compromise received from security server 408. In other words, after receiving an indicator of compromise from security server 408, the receiving proxies 404 subsequently block client messages or requests from clients or connection ids associated with the received indicator of compromise from being transmitted onward to a target server backend, target API or target API server—thereby securing the server backend from clients and connections associated with previously detected indicators of compromise.

Reverting to FIG. 5, in the illustrated embodiment, proxy cluster 504 (comprising proxies 504a, 504b, 504c) is in network communication with security server cluster 508 (comprising security servers 5082, 5084, 5086) configured to receive API data from proxies within proxy cluster 504 and to enable implementation of API security with respect to server backend 506. In an embodiment of the invention, security servers 5082, 5084, 5086 within security server cluster 508 may be individually or collectively configured to implement the method of securing a server backend shown in FIG. 9.

FIG. 5B illustrates a specific configuration of the network architecture, wherein security server cluster 508 comprises security servers 5082, 5084 and 5086, and each of the individual security servers may receive data from one or more proxies within proxy cluster 504. Security server cluster 508 may additionally be accessed and configured by system administrator 501 from a user terminal or through an API configured for this purpose. Security server cluster 508 (or individual servers therewithin) may additionally be communicably coupled with one or more databases 512, which databases may additionally be accessible by proxies within proxy cluster 504.

Figure 9:
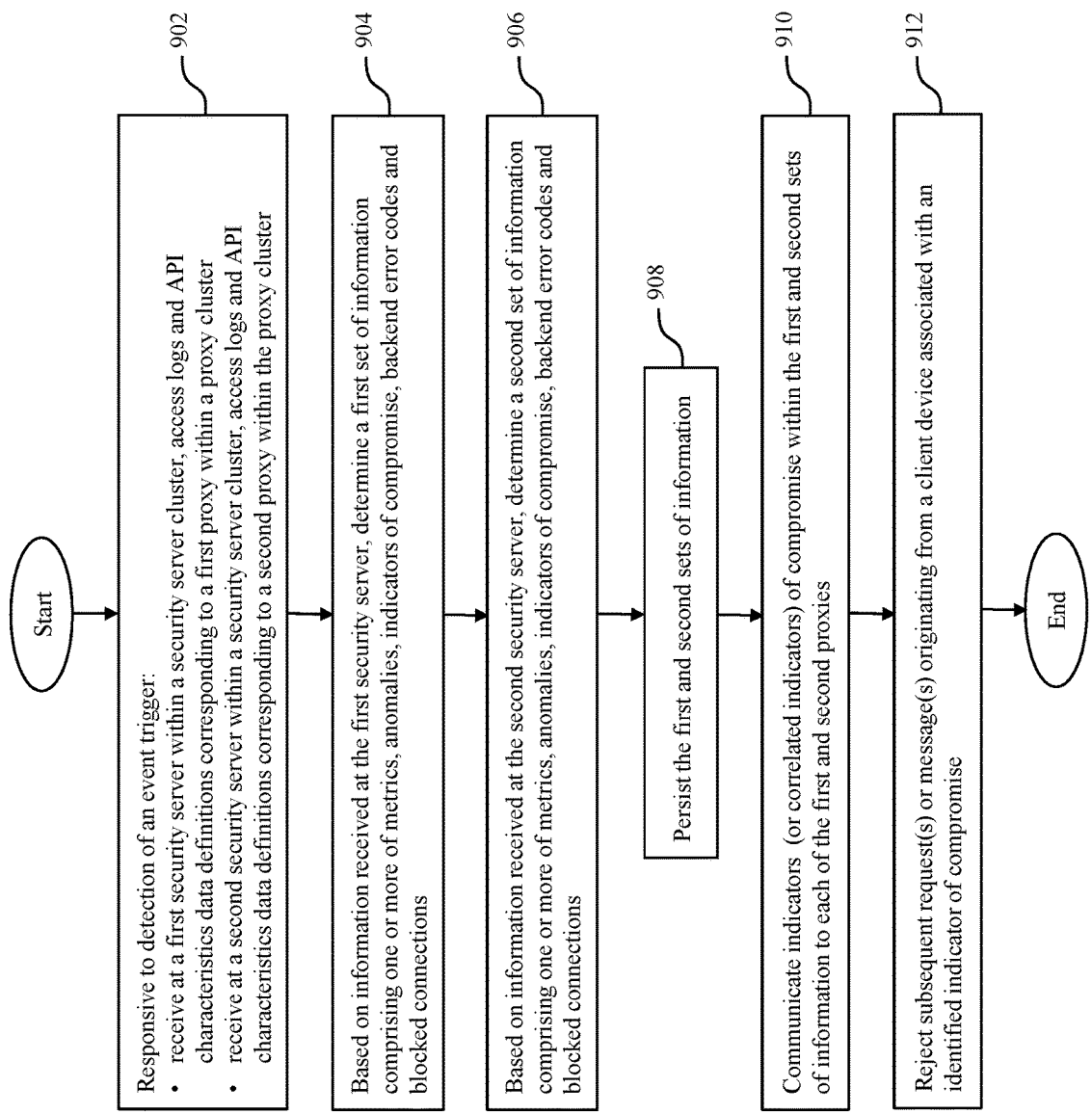

FIG. 9 illustrates a method of securing a server or server backend, including in certain embodiments a server backend comprising one or more API servers. It would be understood that the method of FIG. 9 may be implemented by a security server cluster 508 that is in network communication with a proxy cluster 504 comprising a plurality of proxies of the type illustrated in FIG. 4 (i.e. proxy 404).

At step 902, responsive to a trigger event:
(i) a first security server within security server cluster 508 receives from a first proxy (and possibly from other proxies) within proxy cluster 504:
  (a) proxy access log information, and
  (b) API characteristics data definitions corresponding to at least said first proxy,
(ii) a second security server within security server cluster 508 receives from a second proxy (and possibly from other proxies) within proxy cluster 504:
  (c) proxy access log information, and
  (d) API characteristics data definitions corresponding to at least said second proxy.

In an embodiment, each of the first and second security servers may additionally receive one or more of configuration data, session data and security data corresponding to the first and second proxies respectively. It would additionally be understood that further (i.e. third and other) security servers within security cluster 508 may likewise receive from additional (i.e. third and other) proxies within proxy cluster 504, proxy access log information and API characteristics data definitions (and optionally one or more of configuration data, session data and security data) corresponding to said proxies.

In an invention embodiment, proxy log access information from at one proxy within the proxy cluster may be distributed among a plurality of security servers within the security server cluster. In an embodiment of the invention, each security server receiving proxy access log information from a proxy may additionally receive one or more of API characteristics data definitions, configuration data, session data and security data from said proxy.

The trigger event(s), proxy access log information and API characteristics data definitions may comprise any one or more of the embodiments discussed previously in connection with FIG. 8.

Step 904 comprises determining, generating, or consolidating, based on information received at the first security server, a first set of information comprising one or more of metrics, anomalies, indicators of compromise, back end error codes and blocked connections of the kind discussed in connection with FIG. 8.

Step 906 comprises determining, generating, or consolidating, based on information received at the second security server, a second set of information comprising one or more of metrics, anomalies, indicators of compromise, back end error codes and blocked connections of the kind discussed in connection with FIG. 8.

It would be understood that third and successive sets of information comprising one or more of metrics, anomalies, indicators of compromise, back end error codes and blocked connections may likewise be determined, generated or consolidated at each additional security server within security server cluster 508.

Step 908 comprises optionally persisting at least the first and second (and/or any other) sets of information generated at the security servers. Said sets of information may in an embodiment be persisted in one or more databases associated with the security server cluster.

Step 910 comprises communicating identified indicators of compromise corresponding to at least the first and second (and any other) sets of information generated by the security servers to at least one proxy and preferably a plurality of (and yet more preferably to all) proxies within proxy cluster 504. In an embodiment, step 910 comprises communicating correlated indicators of compromise corresponding to at least the first and second (and any other) sets of information generated by the security servers.

At step 912, one or more proxies 504 subsequently terminate a connection if still active, and reject or discard one or more (and preferably all) subsequent client requests or messages from a client id or connection id associated with an indicator of compromise identified by or received from a security server within security server cluster 508—thereby securing the server backend from clients and connections that have been found responsible for previously detected indicators of compromise.

In an embodiment of the invention, at least one of the first set of information and the second set of information may be acquired by one or more of (i) capturing at each protocol specific data plane or TCP port specific data plane within the first proxy or second proxy, real time API traffic data routed through said data plane, (ii) for each data plane, generating a log uniquely corresponding to said data plane, wherein said log comprises captured real time API traffic data routed through said data plane, and (iii) persisting each generated log file along with a unique id associated with the generated log file.

In a more specific embodiment, in acquiring at least one of the first set of information and the second set of information at least one data plane within the first proxy or second proxy has a plurality of sub-processes uniquely associated therewith. Capture of real time API traffic data routed through such data plane may comprise generating, for each sub-process associated with said data plane, a log uniquely corresponding to said sub-process, wherein said log comprises real time API traffic data routed by said sub-process.

It would be appreciated that receiving access logs and API characteristics data definitions (and optionally configuration data, session data or security data) from across a plurality of proxies within a proxy cluster, enables a security server or cluster of security servers to determine and consolidate metrics, anomalies, indicators of compromise, error codes and blocked connection information with a cluster wide perspective (i.e. across all nodes of the proxy cluster) instead of on a proxy specific basis—which improves the results of data analysis and for better identification of indicators of compromise.

In addition, the data may be further analyzed and consolidated from across a plurality of clusters with machine learning etc. to further increase the level of security and for even better identification of indicators of compromise. FIG. 5C illustrates an embodiment of the invention where security server cluster 504 may received data for analysis and consolidation from a plurality of proxy clusters. In an embodiment of the kind illustrated in FIG. 5C, a security server cluster may be configured to receive data from multiple proxy clusters within a single data center—for example, from proxy cluster 1 (5040) and proxy cluster 2 (5042) within data center 1 (DC1) or from proxy cluster 3 (5044) and proxy cluster 4 (5046) within data center 2 (DC2). In another embodiment, also illustrated in FIG. 5C, the security server cluster may be configured to receive data from multiple proxy clusters distributed across multiple data centers—for example from proxy cluster 1 (5040) and proxy cluster 2 (5042) within data center 1 (DC1) and also from proxy cluster 3 (5044) and proxy cluster 4 (5046) within data center 2 (DC2). It would be understood that proxies within a single proxy cluster may be distributed across a plurality of data centers or clouds or a combination thereof.

Increasing size of the set of cluster wide data has been found to present significantly improved results in view of the machine learning methods and algorithms used for the data analysis by the one or more security servers. Likewise, receiving data from proxy clusters located across data centers may provide improvements in results. By capturing data at proxies within a proxy cluster, and streaming data to a security server or a cluster of security servers, the invention enables use of machine learning to create baselines and to identify deviations from baselines as indicative of anomalies and/or indicators of compromise. The generation of API access logs based on data captured at proxies, streaming of such access logs to one or more security servers, and transmission of anomaly information or indicator of compromise information back from the security servers (or a database associated with one or more security servers) back to the proxies provides efficient security mechanisms for blocking attacks on APIs implemented within one or more API servers within a server backend.

Yet further, the security servers of the present invention are capable of responding to requests or messages corresponding to untrusted devices (i.e. client devices) as well as varying sets of coordinates (e.g. protocols, devices, client programs, URL types, data rates, bandwidths, header types, request payloads etc.)—which enables the invention to be implemented as a modular intermediary implemented directly in the public internet without requiring reconfiguration of a server backend.

Additionally, since the security cluster and security servers therein are not disposed as a communication intermediate between the proxy cluster and the server backend, the security solution of the present invention does not interfere with or create bottlenecks at any client access endpoints—and accordingly does not increase API latency or otherwise affect performance of a server backend.

In an embodiment of the invention, security server 408 or security server cluster 508 is provided with an input API which ensures that access log data and/or API characteristics data definitions (and optionally configuration data, session data or security data) for data analysis and identification of indicators of compromise may only be received from proxies within the proxy cluster—and that a security server(s) or data analysis module or security module within said security server(s) has no other channel of input. The input API may additionally be configured to require authentication of a proxy before receiving access logs and other information from such proxy.

The input API may in an embodiment additionally enable operator inputs for configuring the security server(s), including operator inputs that change one or more predefined thresholds for identification of indicators of compromise— so as to fine tune the accuracy of said security server(s) and/or reduce false positives or false negatives.

The input API may additionally be communicably coupled with a control API for receiving proxy access logs and API characteristics data definitions from each API proxy. The control API enables the security server cluster to manage data loss and organize received logs (corresponding to various APIs) from multiple proxies within the proxy cluster, and to use time stamps associated with such logs to correlate the various logged communications.

FIG. 10 illustrates an exemplary system in which various embodiments of the invention, including one or more proxies within a proxy cluster and/or one or more security servers within a security server cluster, may be implemented.

The system 1002 comprises at-least one processor 1004 and at-least one memory 1006. The processor 1004 executes program instructions and may be a real processor. The processor 1004 may also be a virtual processor. The computer system 1002 is not intended to suggest any limitation as to scope of use or functionality of described embodiments. For example, the computer system 1002 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 1006 may store software for implementing various embodiments of the present invention. The computer system 1002 may have additional components. For example, the computer system 1002 includes one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002, and manages different functionalities of the components of the computer system 1002.

The communication channel(s) 1008 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 1010 may include, but not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not limited to, a user interface on CRT or LCD, printer, speaker, CD/DVD writer, or any other device that provides output from the computer system 1002.

The storage 1014 may include, but not limited to, magnetic disks, magnetic tapes, CD-ROMs, CD-RWs, DVDs, any types of computer memory, magnetic stipes, smart cards, printed barcodes or any other transitory or non-transitory medium which can be used to store information and can be accessed by the computer system 1002. In various embodiments of the present invention, the storage 1014 contains program instructions for implementing the described embodiments.

While not illustrated in FIG. 10, the system of FIG. 10 may further include some or all of the components of a switch of the type more fully described in connection with FIG. 4 hereinabove.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions which is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A proxy node configured for routing client messages to one or more target Application Programming Interfaces (APIs), the proxy node comprising:
   a memory configured to store a set of API characteristics data definitions, each API characteristics data definition from the set of API characteristics data definitions (1) being a data file that is uniquely associated with a n API from a set of APIs and (2) including a name of that API; and
   a processor operatively coupled to the memory, the processor configured to:
      extract, from a message received from a client device, a name of a target API;
      compare the name of the target API against the name of the API included in each API characteristics data definition from the set of API characteristics data definitions;
      responsive to failing to identify, based on the comparing, an API characteristics data definition from the set of API characteristics data definitions including a name of an API that matches the name of the target API, discard the message without onward transmission of the message to an API server identified in the message; and responsive to identifying, based on the comparing, an API characteristics data definition from the set of API characteristics data definitions including a name of an API that matches the name of the target API:

compare at least one of a communication protocol, a protocol method, or a content type specified within the message against one or more permitted communication protocols, permitted protocol methods, or permitted content types specified within the API characteristics data definition that has been identified; and responsive to determining that the at least one of the communication protocol, the protocol method, or the content type specified within the message does not match at least one of the one or more permitted communication protocols, permitted protocol methods, or permitted content types associated with the API characteristics data definition that has been identified, discard the message without onward transmission of the message to the API server.

2. The proxy node as claimed in claim 1, wherein the processor is further configured to, responsive to the discarding the message without onward transmission of the message to the API server, return an error message to the client device.

3. A system for securing one or more Application Programming Interface (API) servers, the system comprising:

a proxy node configured for routing messages from a set of client devices to a set of target APIs implemented on the one or more API servers, the proxy node configured to be included in a networked plurality of proxy nodes, the proxy node configured to:

extract information identifying a target API from the set of target APIs from a message received from a client device from the set of client devices;

transmit the message to an API server implementing the target API;

store information associated with the message as proxy access log information;

transmit data including (1) the proxy access log information and (2) a set of API characteristics data definitions to a security server such that the security server uses the data to identify an indicator of compromise associated with the client device, each API characteristics data definition from the set of API characteristics data definitions being a data file that is uniquely associated with a target API from the set of target APIs; and responsive to receiving the indicator of compromise, discard a subsequent message (1) received from the client device or (2) including a connection identifier associated with the indicator of compromise, without onward transmission of the subsequent message to an API server identified in the subsequent message.

4. The system as claimed in claim 3, further comprising the security server, the security server configured for one or more of generating API metrics, generating blocked connection metrics, generating back end error code metrics, or identifying anomalies.

5. The system as claimed in claim 3, wherein the data further includes:

one or more of configuration data, session data, or security data.

6. The system as claimed in claim 5, wherein:

the proxy access log information includes one or more of (i) time stamp information associated with one or more messages received at or sent from the proxy node, (ii) a connection identifier of a client device communicating with the proxy node, a name of a target API from the set of target APIs and identified in a message received from a client device of the one or more client devices, (iv) a name of an API server of the one or more API servers, or (v) an Internet Protocol (IP) address or a port of a client device of the one or more client devices;

each API characteristics data definition from the set of API characteristics data definitions includes one or more of (i) a client-side name associated with the API uniquely associated with that API characteristics data definition, (ii) a server-side name associated with the API uniquely associated with that API characteristics data definition, (iii) a name of an API server of the one or more API servers that implements the API uniquely associated with that API characteristics data definition, (iv) an IP address of an API server of the one or more API servers that implements the API uniquely associated with that API characteristics data definition, (v) a Transmission Control Protocol (TCP) port associated with the API uniquely associated with that API characteristics data definition, (vi) a login Uniform Resource Locator (URL) or a secure URL associated with the API uniquely associated with that API characteristics data definition, (vii) cookie information, (viii) communication protocols supported by the API uniquely associated with that API characteristics data definition, (ix) protocol methods supported by the API uniquely associated with that API characteristics data definition, (x) content type supported by the API uniquely associated with that API characteristics data definition, or (xi) a data rate limit prescribed in connection with the API uniquely associated with that API characteristics data definition;

the configuration data includes one or more of (i) data port information or routing information associated with an API server from the one or more API servers, (ii) load balancing or routing policies, (iii) load balancing or routing techniques, (iv) management ports, (v) a maximum number of processes or threads for each management port, (vi) policies for generating logs, or (vii) API security settings associated with an API server from the one or more API servers;

the session data includes one or more of (i) cookies, (ii) tokens, or (iii) an identifier of a client device from the set of client devices; or the security data includes one or more of (i) cipher suites, (ii) digital certificates, (iii) session keys and (iv) asymmetric and symmetric ciphers received at the proxy node.

7. A system for securing one or more Application Programming Interface (API) servers, the system comprising:

a networked plurality of proxy nodes configured for routing messages from a set of client devices to at least one target API implemented on the one or more API servers, each proxy node from the networked plurality of proxy nodes configured to:

receive a message from a client device from the set of client devices;

store information associated with the message as proxy access log information;

transmit information including (1) the proxy access log information and (2) a set of API characteristics data definitions to a security server from a plurality of security servers such that the security server uses the information to identify an indicator of compromise associated with the client device, each API characteristics data definition from the set of API characteristics data definitions being a data file that is uniquely associated with an API from the at least one target API; and responsive to receiving the indicator of compromise, discard a subsequent message (1) received from the client device or (2) including a connection identifier associated with the indicator of compromise, without onward transmission of the subsequent message to an API server identified in the subsequent message; and the plurality of security servers including:

a first security server configured to receive a first set of information including proxy access log information from at least a first proxy node from the plurality of proxy nodes, and to analyse the first set of information for identifying a first set of indicators of compromise; and a second security server configured to receive a second set of information including proxy access log information from at least a second proxy node from the plurality of proxy nodes, and to analyse the second set of information for identifying a second set of indicators of compromise.

8. The system as claimed in claim 7, wherein the plurality of security servers comprises a scalable plurality of stateless security servers.

9. The system as claimed in claim 7, wherein the first set of indicators of compromise and the second set of indicators of compromise are persisted to a database.

10. The system as claimed in claim 7, wherein each of the plurality of proxy nodes is further configured to receive the first set of indicators of compromise and the second set of indicators of compromise.

11. The system as claimed in claim 7, wherein:
the first set of information received from the at least the first proxy node includes one or more of the set of API characteristics data definitions, configuration data, session data, or security data, associated with the at least the first proxy node; and
the second set of information received from the at least the second proxy node includes one or more of the set of API characteristics data definitions, configuration data, session data, or security data associated with the at least the second proxy node.

12. The system as claimed in claim 7, wherein the first security server and the second security server are additionally configured for one or more of generating API metrics, generating blocked connection metrics, generating back end error code metrics, or identifying anomalies.

13. A method for routing client messages to a target Application Programming Interface (API), the method comprising:
receiving a message from a client device at a proxy node;
extracting, at the proxy node and from the message, a name of the target API;
comparing, at the proxy node, the name of the target API against a name of an API included in each API characteristics data definition from a set of API characteristics data definitions stored at the proxy node, each API characteristics data definition from the set of API characteristics data definitions (1) being a data file that is uniquely associated with an API from a set of APIs and (2) including the name of that API;

responsive to failing to identify, based on the comparing, an API characteristics data definition from the set of API characteristics data definitions including a name of an API that matches the name of the target API, discarding the message without onward transmission of the message to an API server identified in the message; and responsive to identifying, based on the comparing, an API characteristics data definition from the set of API characteristics data definitions including a name of an API that matches the name of the target API:

comparing at least one of a communication protocol, a protocol method, or a content type specified within the message against one or more permitted communication protocols, permitted protocol methods, or permitted content types specified within the API characteristics data definition that has been identified; and responsive to determining that the at least one of the communication protocol, the protocol method, or the content type specified within the message does not match at least one of the one or more permitted communication protocols, permitted protocol methods, or permitted content types associated with the API characteristics data definition that has been identified, discarding the message without onward transmission of the message to the API server.

14. The method as claimed in claim 13, wherein responsive to the discarding the message without onward transmission of the message to the API server, returning an error message to the client device.

15. A method for securing one or more Application Programming Interface (API) servers, the method comprising:
extracting, at a proxy node, information identifying a target API from message received from a client device;
transmitting, from the proxy node, the message to an API server implementing the target API;
storing, at the proxy node, information associated with the message as proxy access log information;
transmitting, from the proxy node, data including (1) the proxy access log information and (2) a set of API characteristics data definitions, to a security server such that the security server, based on the data, identifies an indicator of compromise associated with the client device, each API characteristics data definition from the set of API characteristics data definitions being a data file that is uniquely associated with an API from a set of APIs implemented on the one or more API servers; and
responsive to receiving the indicator of compromise at the proxy node, discarding a subsequent message (1) received from the client device or (2) including a connection identifier associated with the indicator of compromise, without onward transmission of the subsequent message to an API server identified in the subsequent message.

16. The method as claimed in claim 15, further comprising one or more of generating API metrics, generating blocked connection metrics, generating back end error code metrics, or identifying anomalies, at the security server.

17. The method as claimed in claim 15, wherein the data further includes:
one or more of configuration data, session data, or security data.

18. The method as claimed in claim 17, wherein:
the proxy access log information includes one or more of (i) time stamp information associated with one or more messages received at or sent from the proxy node, (ii) a connection identifier of a client device communicating with the proxy node, (iii) a name of a target API from the set of target APIs and identified in a message received from a client device of the one or more client devices, (iv) a name of an API server of the one or more API servers, or (v) an Internet Protocol (IP) address or a port of a client device of the one or more client devices;

each API characteristics data definition from the set of API characteristics data definitions includes one or more of (i) a client-side name associated with the API uniquely associated with that API characteristics data definition, (ii) a server-side name associated with the API uniquely associated with that API characteristics data definition, (iii) a name of an API server of the one or more API servers that implements the API uniquely associated with that API characteristics data definition, (iv) an IP address of an API server of the one or more API servers that implements the API uniquely associated with that API characteristics data definition, (v) a Transmission Control Protocol (TCP) port associated with the API uniquely associated with that API characteristics data definition, (vi) a login Uniform Resource Locator (URL) or a secure URL associated with the API uniquely associated with that API characteristics data definition, (vii) cookie information, (viii) communication protocols supported by the API uniquely associated with that API characteristics data definition, (ix) protocol methods supported by the API uniquely associated with that API characteristics data definition, (x) content type supported by the API uniquely associated with that API characteristics data definition, or (xi) a data rate limit prescribed in connection with the API uniquely associated with that API characteristics data definition;

the configuration data includes one or more of (i) data port information or routing information associated with an API server from the one or more API servers, (ii) load balancing or routing policies, (iii) load balancing or routing techniques, (iv) management ports, (v) a maximum number of processes or threads for each management port, (vi) policies for generating logs, or (vii) API security settings associated with an API server from the one or more API servers;

the session data includes one or more of (i) cookies, (ii) tokens, or (iii) an identifier of a client device from the set of client devices; or the security data includes one or more of (i) cipher suites, (ii) digital certificates, (iii) session keys or (iv) asymmetric and symmetric ciphers received at the proxy node.

19. A computer program product for routing client messages to a target Application Programming Interface (API), the computer program product comprising a non-transitory computer usable medium having a computer readable program code embodied therein, the computer readable program code comprising instructions for:
extracting, from a message received from a client device at a proxy node, a name of the target API;
comparing the name of the target API against a name of an API included in each API characteristics data definition from a set of API characteristics data definitions stored at the proxy node, each API characteristics data definition from the set of API characteristics data definitions (1) being a data file that is uniquely associated with an API from a set of APIs and (2) including the name of that API;
responsive to failing to identify, based on the comparing, an API characteristics data definition from the set of API characteristics data definitions including a name of an API that matches the name of the target API, discarding the message without onward transmission of the message to an API server identified in the message; and
responsive to identifying, based on the comparing, an API characteristics data definition from the set of API characteristics data definitions including a name of an API that matches the name of the target API:
comparing at least one of a communication protocol, a protocol method, or a content type specified within the message against one or more permitted communication protocols, permitted protocol methods, or permitted content types specified within the API characteristics data definition that has been identified; and
responsive to determining that the at least one of the communication protocol, the protocol method, or the content type specified within the message does not match at least one of the one or more permitted communication protocols, permitted protocol methods, or permitted content types associated with the API characteristics data definition that has been identified, discarding the message without onward transmission of the message to the API server.

20. A computer program product for securing one or more Application Processing Interface (API) servers, the computer program product comprising a non-transitory computer usable medium having a computer readable program code embodied therein, the computer readable program code comprising instructions for:
extracting, at a proxy node, information identifying a target API from message received from a client device;
transmitting, from the proxy node, the message to an API server implementing the target API;
storing, at the proxy node, information associated with the message as proxy access log information;
transmitting, from the proxy node, data including (1) the proxy access log information and (2) a set of API characteristics data definitions to a security server such that the security server, based on the data, identifies an indicator of compromise associated with the client device, each API characteristics data definition from the set of API characteristics data definitions being a data file that is uniquely associated with an API from a set of APIs implemented on the one or more API servers; and
responsive to receiving the indicator of compromise at the proxy node, discarding a subsequent message (1) received from the client device or (2) including a connection identifier associated with the indicator of compromise, without onward transmission of the subsequent message to an API server identified in the subsequent message.

* * * * *